United States Patent
Pham Van et al.

(10) Patent No.: US 12,450,783 B2
(45) Date of Patent: Oct. 21, 2025

(54) OCCUPANCY CODING USING INTER PREDICTION WITH OCTREE OCCUPANCY CODING BASED ON DYNAMIC OPTIMAL BINARY CODER WITH UPDATE ON THE FLY (OBUF) IN GEOMETRY-BASED POINT CLOUD COMPRESSION

(71) Applicant: QUALCOMM Incorporated, San Diego, CA (US)

(72) Inventors: Luong Pham Van, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/300,023

(22) Filed: Apr. 13, 2023

(65) Prior Publication Data

US 2023/0342987 A1 Oct. 26, 2023

Related U.S. Application Data

(60) Provisional application No. 63/363,160, filed on Apr. 18, 2022, provisional application No. 63/331,175, filed on Apr. 14, 2022.

(51) Int. Cl.
*G06T 9/40* (2006.01)

(52) U.S. Cl.
CPC ..................................... *G06T 9/40* (2013.01)

(58) Field of Classification Search
CPC ......... G06T 9/001; G06T 9/004; G06T 9/005; G06T 9/40; H04N 19/597; H04N 19/91
See application file for complete search history.

(56) References Cited

U.S. PATENT DOCUMENTS

| | | | |
|---|---|---|---|
| 2020/0287656 A1* | 9/2020 | Chu | H03M 13/1105 |
| 2022/0159261 A1* | 5/2022 | Oh | H04L 65/60 |
| 2022/0222861 A1* | 7/2022 | Yu | H03M 7/6011 |

(Continued)

FOREIGN PATENT DOCUMENTS

| | | |
|---|---|---|
| CN | 112565764 A | 3/2021 |
| CN | 113676738 A | 11/2021 |

OTHER PUBLICATIONS

"G-PCC 2nd Edition Codec Description", 140. MPEG Meeting, Oct. 24, 2022-Oct. 28, 2022, Mainz, (Motion Picture Expert Group or ISO/IEC JTC1/SC29/WG11), No. n22082, Jan. 12, 2023 (Jan. 12, 2023), 73 Pages, XP030306424.

(Continued)

*Primary Examiner* — Ming Wu
(74) *Attorney, Agent, or Firm* — QUALCOMM Incorporated; Espartaco Diaz Hidalgo

(57) ABSTRACT

A G-PCC coder may determine an occupancy of a reference child node in a reference node, wherein the reference node is in a reference frame of point cloud data used for inter prediction of a current node in a current frame of the point cloud data. The G-PCC coder may further determine a context for decoding a current occupancy bit of a current child node of the current node based on the occupancy of the reference child node, and arithmetic decode the current occupancy bit using the context.

24 Claims, 20 Drawing Sheets

(56) References Cited

U.S. PATENT DOCUMENTS

2022/0337872 A1* 10/2022 Park ................ H04N 19/172
2022/0353549 A1* 11/2022 Lasserre ............ H04N 19/105

OTHER PUBLICATIONS

International Search Report and Written Opinion—PCT/US2023/018611—ISA/EPO—Jul. 17, 2023.
Lasserre S., "[G-PCC] On Improving the OBUF Scheme: Dynamic OBUF", 137. MPEG Meeting, Jan. 10, 2022 (Jan. 10, 2022), pp. 1-21, XP093062423.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

* cited by examiner

*encodeOccupancyFullNeighborgsNZ*

```
// OBUF contexts

Int comp = I << 1;
Int ctxComp = !(Word4[LUTw[comp]] & LUTmask[comp++]) << 1;
ctxComp |= !(Word4[LUTw[comp]] & LUTmask[comp++]);
int ctx2 = (Word4[i] << 2) | ctxComp;

// encode
Int bit = (occupancy >> i) & 1;
If (Sparse[i]) {
    ctx2 |= (Word7Adj[i] & 31) << 6;
    int ctx1 = (Word7Adj[i] >> 5) << i) | partialOccupancy;
    _arithmeticEncoder->encode(bit, _ctxMapOccupancySparse[i].getEvolve(bit, ctx2, ctx1)]);
}
else {
    ctx2 |= (Word7Adj[i] & 7) << 6;
    int ctx1 = (Word7Adj[i] >> 3) << i) | particalOccupancy;
    _arithmeticEncoder->encode(bit, _ctxMapOccupancy[i].getEvolve(bit, ctx2, ctx1)]);
}
```

{ Sparse

{ Non-sparse

FIG. 8

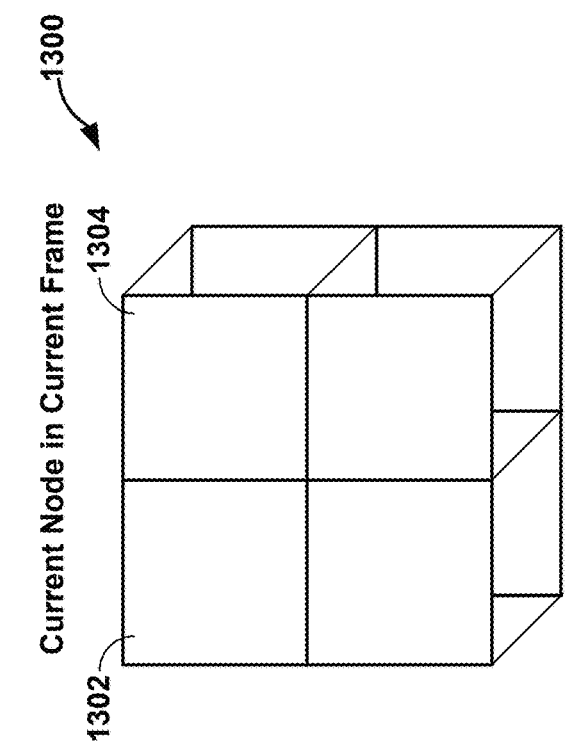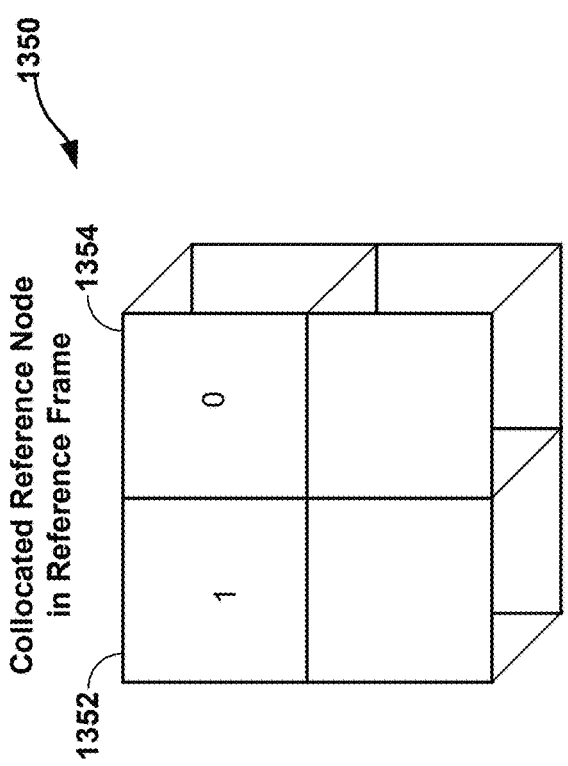
FIG. 13

OCCUPANCY CODING USING INTER PREDICTION WITH OCTREE OCCUPANCY CODING BASED ON DYNAMIC OPTIMAL BINARY CODER WITH UPDATE ON THE FLY (OBUF) IN GEOMETRY-BASED POINT CLOUD COMPRESSION

This application claims the benefit of U.S. Provisional Patent Application No. 63/331,175, filed Apr. 14, 2022, and U.S. Provisional Patent Application No. 63/363,160, filed Apr. 18, 2022, the entire content of each of which is incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for geometry-based point cloud compression (G-PCC). In particular, this disclosure describes techniques that may improve the performance of coding one or more syntax elements related to occupancy, when also coding with inter prediction, for G-PCC related codecs, including the next G-PCC standard that is being developed within MPEG by the 3DG group (WG 7). In general, the occupancy of an inter prediction block (e.g., a block in another frame) may be used in the context selection for occupancy coding of a current node in the octree geometry. In particular, the proposed techniques of this disclosure may be applied to octree occupancy coding based on dynamic optimal binary coder with update on the fly (OBUF).

In a more specific example, a G-PCC coder may determine the occupancy of a reference child node in a reference frame that is collocated with a current child node being coded in a current frame. The G-PCC coder may determine a context (e.g., probability model) for entropy coding an occupancy bit for the current child node based on the occupancy of a reference child node. For inter-predicted frames, the occupancy of collocated nodes in a reference frame may have a strong correlation with the occupancy of a node in a current frame. By using occupancy information of the reference node in context selection for a current node, a more accurate context may be selected, thus improving coding efficiency when arithmetic coding occupancy related syntax elements (e.g., occupancy bits).

In one example, this disclosure describes an apparatus configured to decode point cloud data, the apparatus comprising a memory configured to store the point cloud data, and one or more processors in communication with the memory, the one or more processors configured to determine an occupancy of a reference child node in a reference node, wherein the reference node is in a reference frame of point cloud data used for inter prediction of a current node in a current frame of the point cloud data, determine a context for decoding a current occupancy bit of a current child node of the current node based on the occupancy of the reference child node, and arithmetic decode the current occupancy bit using the context.

In another example, this disclosure describes a method for decoding point cloud data, the method comprising determining an occupancy of a reference child node in a reference node, wherein the reference node is in a reference frame of point cloud data used for inter prediction of a current node in a current frame of the point cloud data, determining a context for decoding a current occupancy bit of a current child node of the current node based on the occupancy of the reference child node, and arithmetic decoding the current occupancy bit using the context.

In another example, this disclosure describes a non-transitory computer-readable storage medium storing instructions that, when executed, cause one or more processors of a device configured to decode point cloud data to determine an occupancy of a reference child node in a reference node, wherein the reference node is in a reference frame of point cloud data used for inter prediction of a current node in a current frame of the point cloud data, determine a context for decoding a current occupancy bit of a current child node of the current node based on the occupancy of the reference child node, and arithmetic decode the current occupancy bit using the context.

In another example, this disclosure describes an apparatus configured to decode point cloud data, the apparatus comprising means for determining an occupancy of a reference child node in a reference node, wherein the reference node is in a reference frame of point cloud data used for inter prediction of a current node in a current frame of the point cloud data, means for determining a context for decoding a current occupancy bit of a current child node of the current node based on the occupancy of the reference child node, and means for arithmetic decoding the current occupancy bit using the context.

The details of one or more examples are set forth in the accompanying drawings and the description below. Other features, objects, and advantages will be apparent from the description, drawings, and claims.

BRIEF DESCRIPTION OF DRAWINGS

FIG. 8 illustrates example code for context selection based on dynamic OBUF in occupancy coding for use in conjunction with the techniques of the disclosure.

FIG. 13 is a conceptual diagram illustrating an example of context selection based on the occupancy of a collocated reference child node for use in conjunction with the techniques of the disclosure.

DETAILED DESCRIPTION

Figure 1:
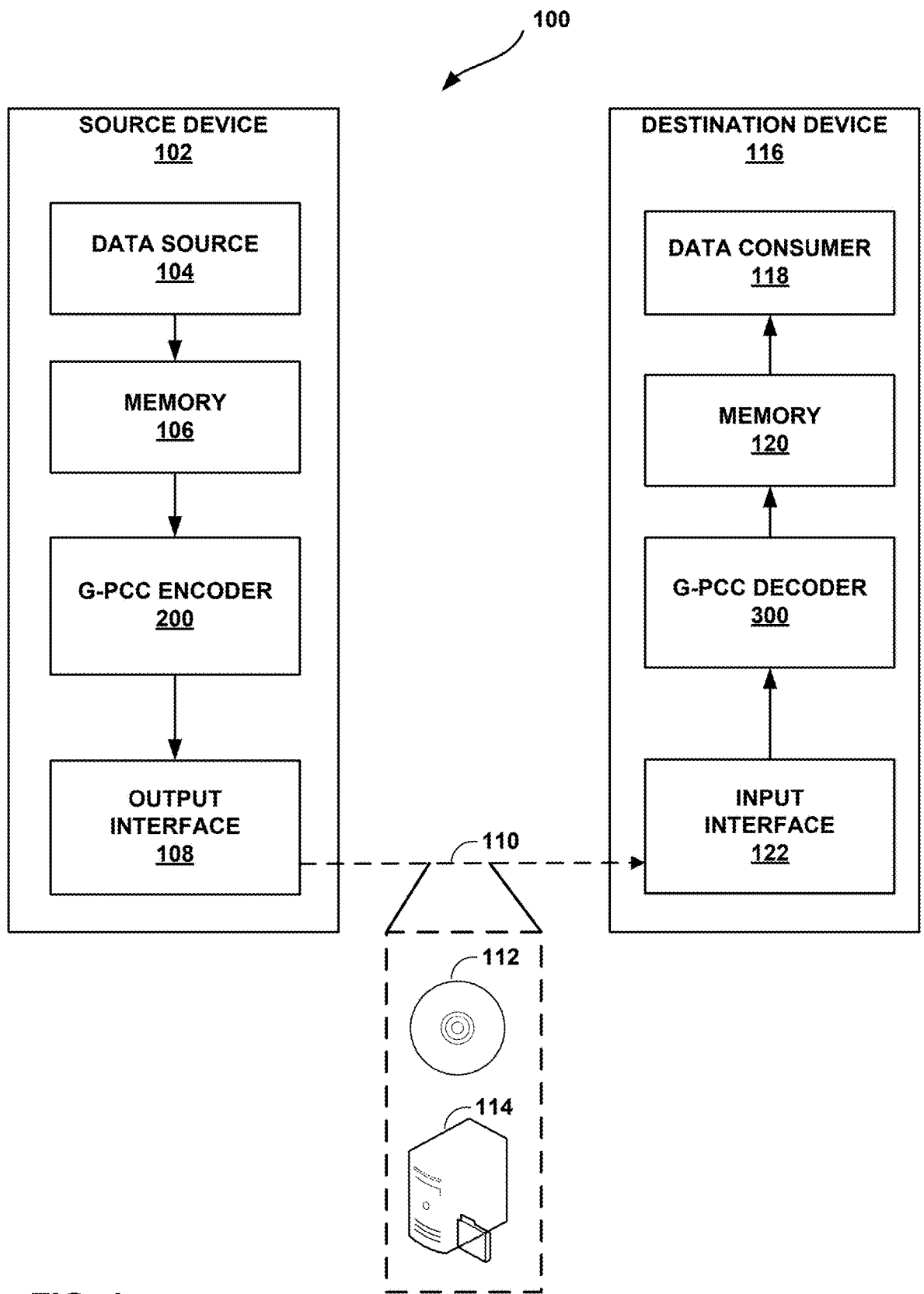
FIG. 1 is a block diagram illustrating an example encoding and decoding system that may perform the techniques of this disclosure.

Geometry-based point cloud compression (G-PCC) techniques aim to reduce the amount of data required to represent a point cloud, while preserving its geometric structure as much as possible. G-PCC may be used for various applications, such as 3D graphics, virtual reality, and autonomous driving, where it may be beneficial to transmit or store large point clouds efficiently.

One technique used in geometry-based point cloud compression is voxelization. Voxelization involves dividing the 3D space into a regular grid of small cubes (e.g., voxels or nodes), each of which represents a small volume of space. The points in the point cloud are then assigned to the voxel they fall within. This voxelized representation can be used to efficiently encode the geometry of the point cloud, as only the voxel coordinates and the points within the voxels need to be transmitted or stored.

Occupancy coding is a technique used to further reduce the amount of data required to represent the point cloud. In occupancy coding, a binary value is assigned to each voxel/ node to indicate whether it contains any points from the point cloud (occupied) or not (unoccupied). The occupancy information is then encoded and transmitted along with the positions of the occupied voxels.

By using occupancy coding, the number of points to be transmitted can be reduced as only the positions of the occupied voxels need to be transmitted, rather than the positions of all points in the point cloud. However, this technique can result in a loss of detail as some unoccupied voxels may be discarded, which can affect the overall quality of the reconstructed point cloud.

To further improve compression efficiency, occupancy coding is often used in conjunction with other compression techniques such as octree-based decomposition and prediction-based coding. Octree-based decomposition involves recursively subdividing a frame of point clouds into octants (cubes of half the size). Prediction-based coding involves predicting the positions of some points based on the positions of neighbouring points and transmitting only the difference between the predicted and actual positions. In some examples of G-PCCC the prediction-based coding may include inter-prediction coding, where point clouds in a current frame may be coded relative to point clouds in another, reference frame of point cloud data.

This disclosure describes techniques that may improve the performance of coding one or more syntax elements related to occupancy, when also coding with inter prediction. In general, the occupancy of an inter prediction block (e.g., a block in another frame) may be used in the context selection for occupancy coding of a current node in the octree geometry. In particular, the proposed techniques of this disclosure may be applied to octree occupancy coding based on dynamic optimal binary coder with update on the fly (OBUF). Previous techniques for context selection for occupancy bits only used information from a current frame of point cloud data. As such, the accuracy of context selection may be sub-optimal.

In a more specific example of the disclosure, a G-PCC coder may determine the occupancy of a reference child node in a reference frame that is collocated with a current child node being coded in a current frame. The G-PCC coder may determine a context (e.g., probability model) for entropy coding an occupancy bit for the current child node based on the occupancy of a reference child node. For inter-predicted frames, the occupancy of collocated nodes in a reference frame may have a strong correlation with the occupancy of a node in a current frame. By using occupancy information of the reference node in context selection for a current node, a more accurate context may be selected, thus improving coding efficiency when arithmetic coding syntax elements.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this. Source device 102 and destination device 116 are merely examples of such devices in which source device 102 generates coded data for transmission to destination device 116. This disclosure refers to a "coding" device as a device that performs coding (encoding and/or decoding) of data.

Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG 3DG (JTC 1/SC 29/WG 7) is studying the potential need for standardization of point cloud coding technology with a compression capability that significantly exceeds that of the current approaches. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds).

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
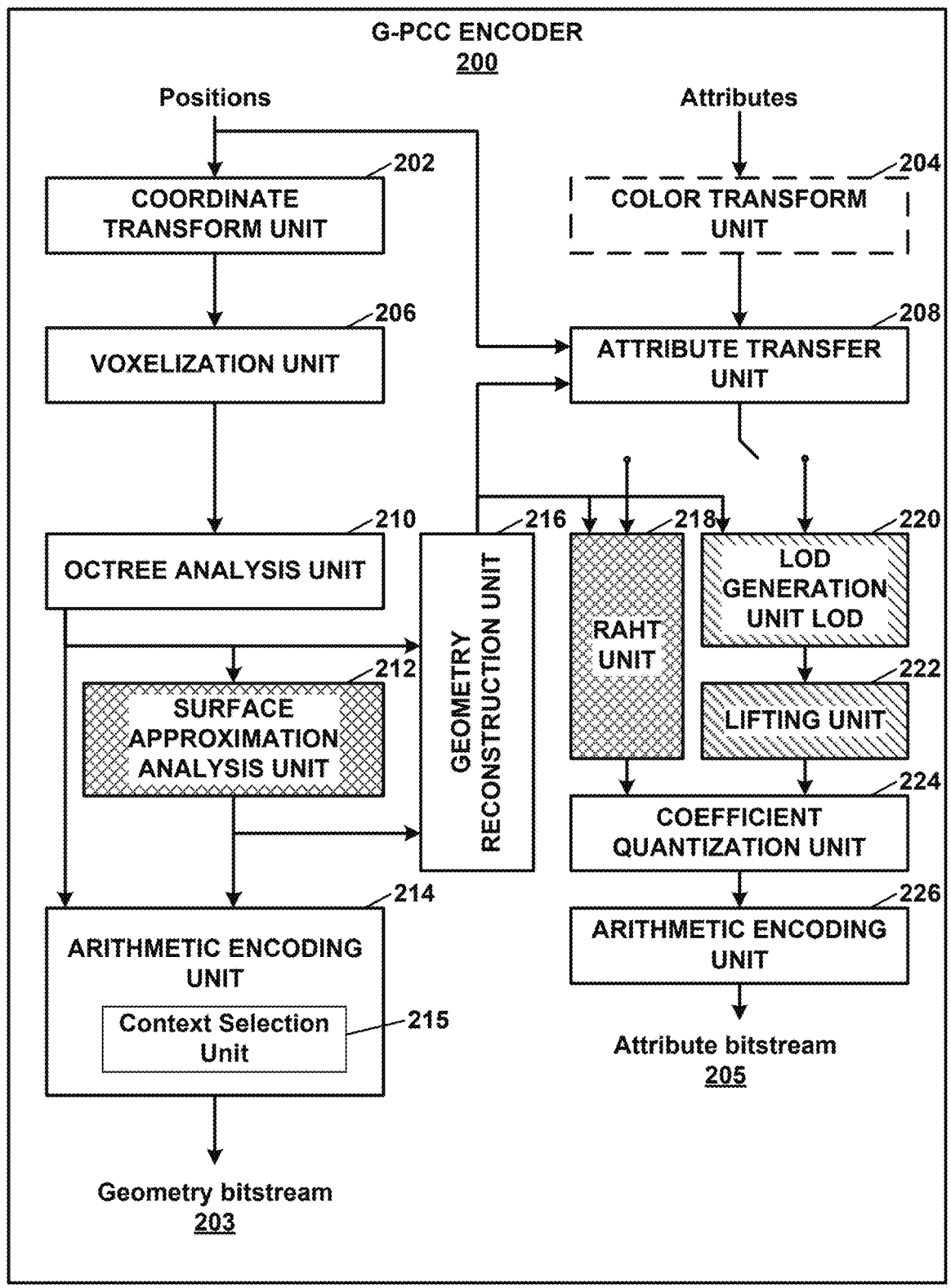
FIG. 2 is a block diagram illustrating an example Geometry Point Cloud Compression (G-PCC) encoder that may perform the techniques of this disclosure.
Figure 3:
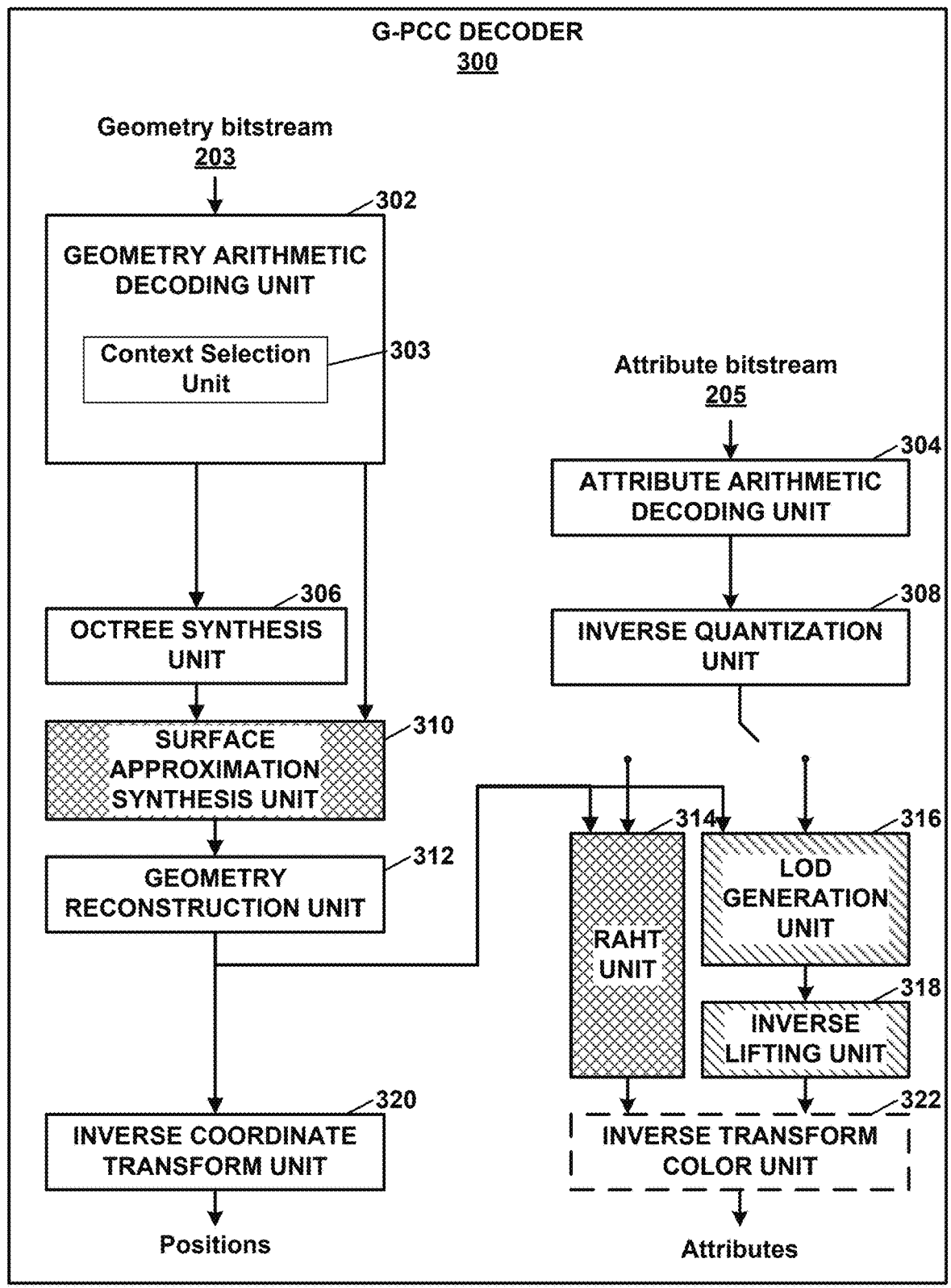
FIG. 3 is a block diagram illustrating an example G-PCC decoder that may perform the techniques of this disclosure.

FIG. 2 provides an overview of G-PCC encoder 200. FIG. 3 provides an overview of G-PCC decoder 300. The modules shown are logical, and do not necessarily correspond one-to-one to implemented code in a reference implementation of the G-PCC codec.

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighbourhoods are specified including (a) nodes that share a face with a current octree node, (b) nodes that share a face, edge or a vertex with the current octree node, etc. Within each neighbourhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighbouring nodes or based on a sampling distance.

At G-PCC encoder 200, the residuals obtained as the output of the coding methods for the attributes are quantized.

The residuals may be obtained by subtracting the attribute value from a prediction that is derived based on the points in the neighbourhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Arithmetic encoding unit 214 may include context selection unit 215. Context selection unit 215 may be configured to perform one or more techniques of the disclosure. For example, as will be explained in more detail below, context selection unit 215 may be configured to determine an occupancy of a reference child node in a reference node, wherein the reference node is in a reference frame of point cloud data used for inter prediction of a current node in a current frame of the point cloud data, determine a context for decoding a current occupancy bit of a current child node of the current node based on the occupancy of the reference child node, and arithmetic encode the current occupancy bit using the context. By using occupancy information of the reference node in context selection for a current node, a more accurate context may be selected, thus improving coding efficiency when arithmetic coding occupancy related syntax elements (e.g., occupancy bits).

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, ... LODN is obtained by union of RL1, RL2, ... RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Geometry arithmetic decoding unit 302 may include context selection unit 303. Context selection unit 303 may be configured to perform one or more techniques of the disclosure. For example, as will be explained in more detail below, context selection unit 303 may be configured to determine an occupancy of a reference child node in a reference node, wherein the reference node is in a reference frame of point cloud data used for inter prediction of a current node in a current frame of the point cloud data, determine a context for decoding a current occupancy bit of a current child node of the current node based on the occupancy of the reference child node, and arithmetic decode the current occupancy bit using the context. By using occupancy information of the reference node in context selection for a current node, a more accurate context may be selected, thus improving coding efficiency when arithmetic coding occupancy related syntax elements (e.g., occupancy bits).

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

G-PCC Planar Coding Modes

Examples of tools used in G-PCC include a planar coding mode. G-PCC may also include an angular coding mode that that may enhance the coding efficiency of the planar mode by using the sensor characteristics of a typical LIDAR sensor. The angular coding mode is optionally used together with the planar mode and improves the coding of the vertical (z) plane position syntax element by employing knowledge of positions and angles of sensing laser beams in a typical LIDAR sensor. Furthermore, the angular coding mode can optionally be used to improve the coding of vertical z-position bits and the horizontal x,y positions in an inferred direct coding mode (IDCM). A first node in the octree may be coded as an IDCM mode. When a node is coded with IDCM mode, the occupancy bits of the child nodes of the first node are not signalled. Instead, the position of the points contained in the first node are explicitly signalled. These positions that are signalled are not the explicit position of the points in the point cloud, or the positions of the points with respect to the octree origin or slice origin. Rather, the position of the points in the first node that are signalled are those that are relative to the node position. One or more of x, y, z coordinates of the positions of points in the node are coded. In one example, at most two positions may be coded in an IDCM node. In one example contribution to G-PCC, the context derivation for the angular coding mode was simplified, and the high level syntax (HLS) coding of sensor data parameters was made more efficient.

The azimuthal coding mode may also be used in G-PCC. The azimuthal coding mode is similar to the angular mode and extends the angular mode to the coding of the (x) and (y) plane position syntax elements of the planar mode and improves the coding of the x- or y-position bits in IDCM. In one contribution to G-PCC, the number of contexts used in the azimuthal mode was significantly reduced.

Occupancy Coding of Octree Geometry

Figure 4:
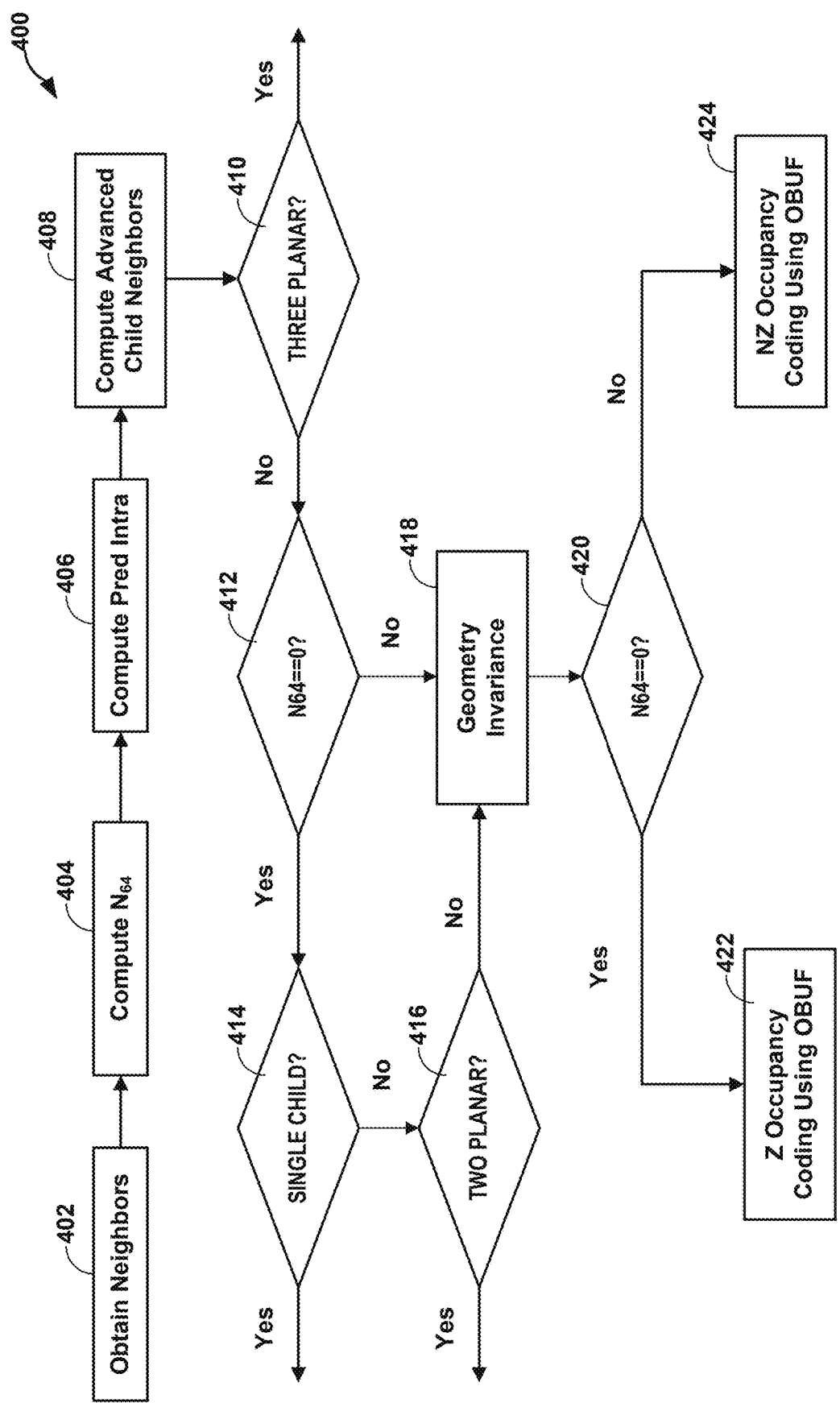
FIG. 4 is a flowchart illustrating an example of occupancy coding in G-PCC for use in conjunction with the techniques of the disclosure.

The encoding of occupancy for geometry octree-based point clouds may be summarized in FIG. 4. FIG. 4 is a flowchart illustrating an example process 400 for occupancy coding in G-PCC.

In general, in one example of G-PCC, the occupancy of a node is encoded using context-based entropy coding in which the context index is adaptively derived based on the occupancy information of the neighbour nodes and the planar information of the current node. A G-PCC coder (e.g., G-PCC encoder 200 or G-PCC decoder 300) may determine occupancy information of neighbor nodes relative to the current node (obtain neighbors 402). The G-PCC coder may then computer a neighbour configuration N64 (an integer number) of neighbour nodes (Compute $N_{64}$ 404). N64 refers the 64 possible neighbour configurations based on an 6-bit pattern (e.g., the nodes that share the 6 faces of the current node). In general, the neighbour configuration refers to the spatial relationships between neighbouring points in the point cloud. In some examples, the neighbour configuration refers to the configuration of the point's neighbouing points that are within a certain distance threshold, which is often determined by the resolution of the point cloud.

By encoding the neighbour configuration of a point, a compressed point cloud can be reconstructed with greater accuracy, as neighbouring points can provide additional information about the occupancy, surface geometry, and curvature (if applicable) in the vicinity of the point. Neighbor configuration can also help reduce the amount of data required to represent the point cloud by more effectively predicting the occupancy of the current point based on the occupancy of the neighbouring points, or enabling better selection of contexts to predict the occupancy of the current point.

Then, the G-PCC coder performs occupancy prediction of the current node (compute pred intra 406) is performed using the neighbour information and N64. In general, the G-PCC uses information of the neighbors of the current node to predict whether the current node is occupied or not. The G-PCC coder may also calculate the occupancy of advanced child neighbours (compute advanced child neighbors 408). The advanced child neighbors may be child nodes of the neighbor nodes. The G-PCC coder may then use the planar information of the current node to determine whether an occupancy bit of the current node needs to be encoded or may be explicitly derived in the decoder. If an occupancy bit of the current node needs to be encoded, the context is obtained using the N64, the computed intra prediction of the current node, and the advanced child neighbour information.

For example, the G-PCC may first determine if the current node may be coded using three planar flags (410). If yes at 410, occupancy information for the current node is not coded (e.g., not signaled or decoded). If no at 410, the G-PCC coder then determines if the N64 value is 0 (412). N64 equal to zero means that all neighbor nodes are unoccupied. If yes at 412, the G-PCC coder then determines if the current node has a single child or is single planar (414). If yes at 414, occupancy information for the current node is not coded. If no at 414, the G-PCC coder determines if the current node may be coded using two planar flags (416). If yes at 416, occupancy information for the current node is not coded.

If the current node is not coded in planar mode (e.g., all of 410, 414, and 416 are No), and the N64 value is not 0 (No at 412), then the G-PCC coder determines a geometry invariance (418) to update the N64 value. The neighbourhood configuration includes neighbours in all the three directions relative to the node. However, two configurations may be considered invariant to each other based on whether two configurations appear identical to the node with respect to the respective dimensions. For example, suppose that a node N has a position (x, y, z). In the first case, N has only one neighbour at (x+1, y, z). In another case, suppose N has only one neighbour at (x, y+1, z). Although the neighbourhood configuration in each of the two cases is different, they are considered geometrically invariant because the configuration of the first case with respect to the x-axis is the same as the configuration of the second case with respect to the y-axis. Similarly neighbour configuration with two nodes (x+1, y, z) and (x, y, z+1) may be considered to be invariant to neighbour configuration with two nodes (x+1, y, z) and (x, y+1, z). The geometrical invariance of the configurations may be used to reduce the number of possible values of N64, thus reducing the number of context states.

The G-PCC coder then again determines if the N64 value is 0 (420). If yes, at 420, this means that all neighbor nodes are occupied, and that the G-PCC coder may code the occupancy bit of the current node using zero (Z) occupancy coding using optimal binary coder with update on the fly (OBUF) (422). In general, Z occupancy coding using OBUF selects a particular arithmetic coder among a set of arithmetic coders to code the occupancy bit. If yes, at 420, this means that at least one of the neighbor nodes is occupied, and that the G-PCC coder may code the occupancy bit of the current node using non-zero (NZ) occupancy coding using OBUF (424).

Coding using OBUF may include two general steps: in the first step, for the occupancy of a given child node to be encoded, a binary arithmetic coder is selected from a set of binary arithmetic coders. This decision of choosing a particular arithmetic coder is dependent on the index of the child node and a dependence state that is derived from the neighbourhood information. The dependence state X may take one of several values, where value corresponds one or more neighbourhood configurations. Each arithmetic coder is associated with a probability, and the probabilities of the binary arithmetic coders are chosen such that together they cover the probability range of [0,1], i.e., a set of increasing probability values are associated with the coders such that the first value is close to 0 and the last value is close to 1. The decision of choosing the binary arithmetic coder for an i-th child node is obtained using an i-th look-up table that maps the index i and dependence state X to an index to an arithmetic coder. Once the bit is coded, the look up table corresponding to the index i and given dependence state X is updated to take in to account the coded bit; as a result, the index of the arithmetic coder corresponding to index i and dependence state X may be modified (typically the index increments or decrements by 1).

The following is an excerpt from Section 9.2.10 of Draft 22 of the G-PCC standard.

Occupancy Coding Using Bit-Wise Coding in Section 9.2.10 of G-PCC FDIS, ISO/IEC JTC1/SC29/WG11 m55637 (Draft 22)

9.2.10 Bitwise Occupancy Coding 9.2.10.1 General

Subclause 9.2.1.0 applies when occtree_bitwise_coding is 1.

The neighbourhood-permuted node occupancy bitmap shall be coded as a sequence of individual occupancy_bit syntax elements. Coding uses constraints on occupancy to infer the value of certain occupancy_bit syntax elements.

Entropy coding of each coded bit is contextualized by a combination of the coded bit index, previously coded occupancy_bit syntax elements, the reduced occupied neighbourhood pattern, the number of spatially adjacent child nodes in neighbouring nodes and a ternary prediction based upon the presence of neighbouring nodes.

9.2.10.2 Correspondence Between the Node Occupancy Bitmap and Occupancy_Bit

Bits of the neighbourhood-permuted node occupancy bitmap shall be coded in the order specified by Table 19. Each occupancy_bit[cbIdx] syntax element codes the bit OccBitCodingOrder[cbIdx].

The expression OccBitIdx[cbIdx] is the bit position in the node occupancy bitmap of the bit coded by occupancy_bit [cbIdx]. For example, when OccNeighPat is 17, occupancy_bit[6] corresponds to the second bit ($b_1$) of the node occupancy bitmap.

OccBitIdx[cbIdx]:=OccBitIdxFromNpBit[OccBitCodingOrder[cbIdx]]

The expression OccBitLocC[cbIdx][k] is the node-relative child location represented by occupancy bit[cbIdx].

OccBitLocC[cbIdx][k]:=OccLocC[OccBitIdx[cbIdx]][k]

The expression OccBitMap is the node occupancy bitmap.

OccBitMap:=
  OccBitMap=0
  for (cbIdx=0; cbIdx<8; cbIdx++)
    OccBitMap=OccBitMap|(occupancy_bit[cbIdx]
      <<OccBitIdx[cbIdx])

TABLE 19

Order for coding bits of the neighbourhood-permuted node
occupancy bitmap as occupancy_bit[cbIdx]

| cbIdx | 0 | 1 | 2 | 3 | 4 | 5 | 6 | 7 |
|---|---|---|---|---|---|---|---|---|
| OccBitCodingOrder[cbIdx] | 1 | 7 | 5 | 3 | 2 | 6 | 4 | 0 |

9.2.10.3 Presence of Occupancy_Bit

An occupancy bitmap bit shall not be coded if its value can be inferred to be set or unset. The expression OccBitPresent[cbIdx] specifies whether occupancy_bit[cbIdx] is present.

OccBitPresent[cbIdx]:=¬(OccBitInferUnset[cbIdx]||OccBitInferSet[cbIdx])

9.2.10.4 Inference of an Unset Bit

An occupancy bitmap bit shall be inferred to be 0 when either:
- the bit represents an invalid child according to the node's coded axes (9.2.2.3), or
- the bit represents a child within an unoccupied plane signalled by planar occupancy coding.

When the expression OccBitInferUnset[cbIdx] is equal to 1, occupancy_bit[cbIdx] shall be inferred to be 0.

OccBitInferUnset[cbIdx]:=
  ¬AxisCoded[0]&& OccBitLocC[cbIdx][0]
  ||¬AxisCoded[1]&& OccBitLocC[cbIdx][1]
  ||¬AxisCoded[2]&& OccBitLocC[cbIdx][2]
  ||¬PlanarFreeAxis[0]&&    OccBitLocC[cbIdx][0]
    ^occ_plane_pos[0]
  ||¬PlanarFreeAxis[1]&&    OccBitLocC[cbIdx][1]
    ^occ_plane_pos[1]
  ||¬PlanarFreeAxis[2]&&    OccBitLocC[cbIdx][2]
    ^occ_plane_pos[2]

9.2.10.5 Inference of a Set Bit

An occupancy bitmap bit occupancy_bit[cbIdx] shall be inferred to be 1, as specified by the expression OccBitInferSet[cbIdx], when:
- the bit is the last present bit and all previous coded bits are 0, or
- the bit is the penultimate present bit, all previous coded bits are 0 and the node is required to have two child nodes, or
- the bit is in a plane identified as occupied by planar occupancy coding, the bit is the last bit in the plane and all previous bits in the plane are 0.

OccBitInferSet[cbIdx]:=
  PlanarEligible[0]&& PopCnt(OccKnownZero & (0x0F<<4×OccBitLocC[cbIdx][0]))==3
  ||PlanarEligible[1]&& PopCnt(OccKnownZero & (0x33<<2×OccBitLocC[cbIdx][1]))==3
  ||PlanarEligible[2]&& PopCnt(OccKnownZero & (0x55<<1×OccBitLocC[cbIdx][2]))==3
  ||cbIdx==6 && PopCnt(OccKnown) 0 && OccMinChildren==2 cbIdx==7 && PopCnt(OccKnown)==0

The expression OccKnownMask is a bit mask that identifies bits of the node occupancy bitmap that have a known value prior to coding occupancy bit[cbIdx].

OccKnownMask:=
  OccKnownMask=0
  for (i=0; i<cbIdx; i++)
    OccKnownMask|=1<<OccBitIdx[i]
  for (i=0; i<8; i++)
    OccKnownMask|=OccBitInferUnset[i]<<OccBitIdx[i]

The expression OccKnown is the partially coded node occupancy bitmap comprising the bits coded prior to occupancy bit[cbIdx].

OccKnown:=
  OccKnown=0
  for (i=0; i<cbIdx; i++)
    OccKnown|=occupancy_bit[i]<<OccBitIdx[i]

The expression OccKnownZero is a bitmap of occupancy bits that are known to be 0.

OccKnownZero:=(0xFF^OccKnown) & OccKnownMask 9.2.10.6 Contextualization 9.2.10.6.1 General Contextualization of occupancy_bit syntax elements is a two-stage process. First, context discriminators are used to select a demi-CPM. Then, the demi-CPM is used to select the CPM that codes the syntax element.

A demi-CPM is an 8-bit unsigned integer that models the probability of a coded zero-valued occupancy_bit syntax element.

The values 0, 128 and 256 represent the probability of a zero bin as impossible, equiprobable and certain, respectively. The values 0 and 256 can never be attained due to the operation of the probability models' update process.

9.2.10.6.2 State Variables

Context selection is specified in terms of the following state variable: The array OccCtxSel; OccCtxSel[selNeigh][cbIdx][selSib][selAdj][selPred] is a demi-CPM, contextualized by selNeigh, cbIdx, selSib, selAdj and selPred.

9.2.10.6.3 Initial State

The demi-CPMs shall be initialized at the start of every GDU.

When slice_entropy_continuation is 1, initialization shall be performed according to the parsing state restoration process (11.6.2.2).

Otherwise (slice_entropy_continuation is 0), all elements of OccCtxSel shall be set to 127.

9.2.10.6.4 Determination of CtxIdxOccBit for the Syntax Element Occupancy_Bit

The expression OccCtxSelVar specifies the demi-CPM for the syntax element occupancy_bit[CbIdx] using:
- SelNeigh, the reduced occupied neighbourhood context discriminator (9.2.10.6.6);
- SelSib, the sibling occupancy context discriminator (9.2.10.6.7);
- SelAdj, the adjacent child neighbour context discriminator (9.2.10.6.8);
- SelPred, the neighbour-predicted occupancy context discriminator (9.2.10.6.9).

OccCtxSelVar:=OccCtxSel[SelNeigh][CbIdx][SelSib][SelAdj][SelPred]

The CPM index, CtxIdxOccBit, shall be the value of the demi-CPM exclusive of the bottom three bits:

CtxIdxOccBit:=OccCtxSelVar>>3

9.2.10.6.5 Update after Each Coded Occupancy_Bit Syntax Element

After each coded occupancy_bit syntax element, its demi-CPM shall be updated. The update specified by Table 20 supplies a value for incrementing or decrementing the probability of a zero bin based upon the upper four bits of the demi-CPM's value:

if (OccBitPresent[CbIdx])
  if (occupancy_bit[CbIdx])
    OccCtxSelVar+=OccCtxSelUpdate[255−OccCtxSelVar>>4]
  else
    OccCtxSelVar−=OccCtxSelUpdate[OccCtxSelVar>>4]

TABLE 20

| Values of OccCtxSelUpdate[i] | | | | | | | | | | | | | | | | |
|---|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 | 15 |
| OccCtxSel-Update[i] | 0 | 1 | 1 | 2 | 4 | 7 | 9 | 11 | 14 | 16 | 19 | 23 | 22 | 18 | 13 | 6 |

9.2.10.6.6 Reduced Occupied Neighbourhood Context Discriminator

The reduced occupied neighbourhood context discriminator shall distinguish between different reduced occupied neighbourhood patterns (OccNeighPatR) depending upon the coded bit index (CbIdx) as specified by Table 21 as the expression SelNeigh.

TABLE 21

Discriminated values SelNeigh for occupancy_bit[CbIdx] and OccNeighPatR

| | OccNeighPatR | | | | | | | | |
|---|---|---|---|---|---|---|---|---|---|
| CbIdx | 0 | 1 | 2 | 3 | 4 | 5 | 6 | 7 | 8 |
| 0 . . . 3 | 0 | 1 | 2 | 3 | 4 | 5 | 6 | 7 | 8 |
| 4 . . . 5 | 0 | 1 | 2 | 3 | 1 | 2 | 3 | 4 | 4 |
| 6 | 0 | 1 | 1 | 2 | 2 | 1 | 2 | 2 | 2 |
| 7 | 0 | 1 | 1 | 1 | 1 | 1 | 1 | 1 | 1 |

9.2.10.6.7 Sibling Occupancy Context Discriminator

The sibling occupancy context discriminator shall distinguish between arrangements of previously coded/inferred siblings for the node coded by occupancy_bit[CbIdx] as specified by the expression SelSib:

If there are no nodes present in the occupied neighbourhood pattern, discrimination shall be by the number of present child nodes identified by the syntax elements occupancy_bit[i] with i<CbIdx.

If there is at least one node present in the occupied neighbourhood pattern, discrimination shall be by the combination of present child nodes identified by the syntax elements occupancy bit[i] with i<CbIdx.

SelSib:=OccNeighPat ?occPrevBits: PopCnt(occPrevBits)

The expression occPrevBits is the concatenation of occupancy bit[i] for i<CbIdx.

occPrevBits
  occPrevBits=0
  for (i=0; i<CbIdx; i++)
    occPrevBits|=occupancy_bit[i]<<i 9.2.10.6.8 Adjacent Child Neighbour Context Discriminator The adjacent child neighbour context discriminator for child the node coded by occupancy_bit[CbIdx] is specified by the expression SelAdj. When adjacent child neighbour contextualization is enabled (occtree_adjacent_child_enabled is 1), it distinguishes between contexts by:

the number of child nodes from available, previously coded nodes in the same tree level (9.2.7.2) that adjoin the coded child by a face; and whether any of the available, previously coded nodes in the same tree level that adjoin the coded child node do not have a child node that also adjoins the coded child.

Figure 10:
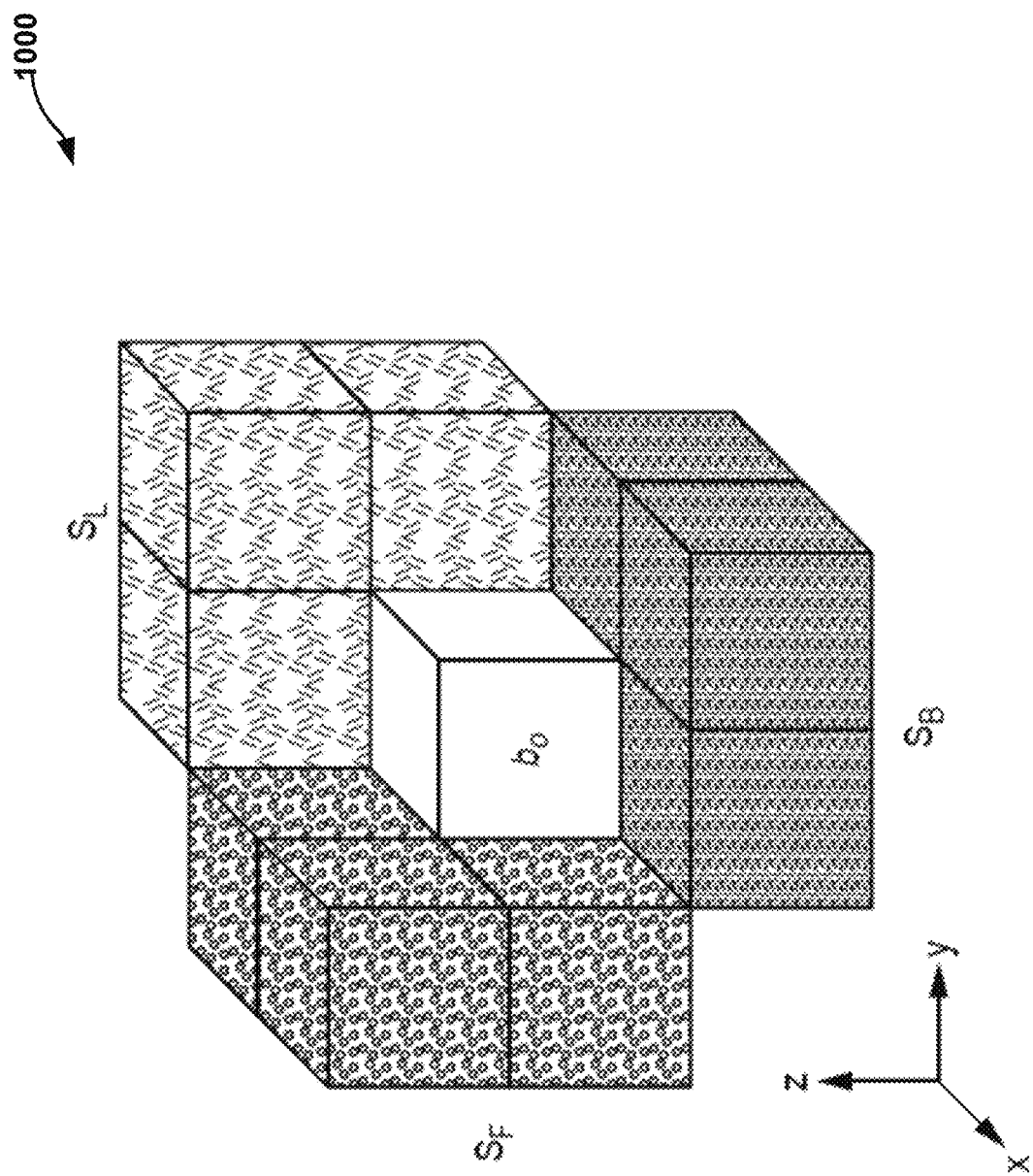
FIG. 10 is a conceptual diagram illustrating example neighbour nodes to obtain Sparse and Word7 for the child node 0 for use in conjunction with the techniques of the disclosure.

An example is illustrated in FIG. 10.* The child node $C_0$ of the coded node N is adjoined by a single child node. There are two available previously coded nodes that adjoin $C_0$, one of which does not contain a child node that also adjoins C0.

SelAdj:=occtree_adjacent_child_enabled
  ?2×Min(2, adjCntC)+((cbIdx≤4||adjCntC==1) && adjUnocc):0

The expression adjOccN[k] identifies whether there is a spatially adjacent node along the k-th axis within the occupied neighbourhood availability window. Values for the expressions ds, dt and dv are specified in Table 22 for each axis k.

adjOccN[k]:=¬OccBitLocC[CbIdx][k]&& OccNeigh[Ns+ds][Nt+dt][Nv+dv]

The expression adjOccC[k] identifies whether there is a spatially adjacent child node along the k-th axis within the occupied neighbourhood availability window. Values for the expressions ds, dt and dv are specified in Table 22 for each axis, k.

adjOccC[k]:=adjOccN[k]&& OccNodePresent[Dpth+1][cs+ds][ct+dt][cv+dv]≠0
  where
    cs:=NsC+OccBitLocC[CbIdx][0]
    ct:=NtC+OccBitLocC[CbIdx][1]
    cv:=NvC+OccBitLocC[CbIdx][2]

TABLE 22

Relative neighbour locations (ds, dt, dv) used in the computation of adjOccN[k] and adjOccC[k]

| k | ds | dt | dv |
|---|---|---|---|
| 0 | −1 | 0 | 0 |
| 1 | 0 | −1 | 0 |
| 2 | 0 | 0 | −1 |

Figure 5:
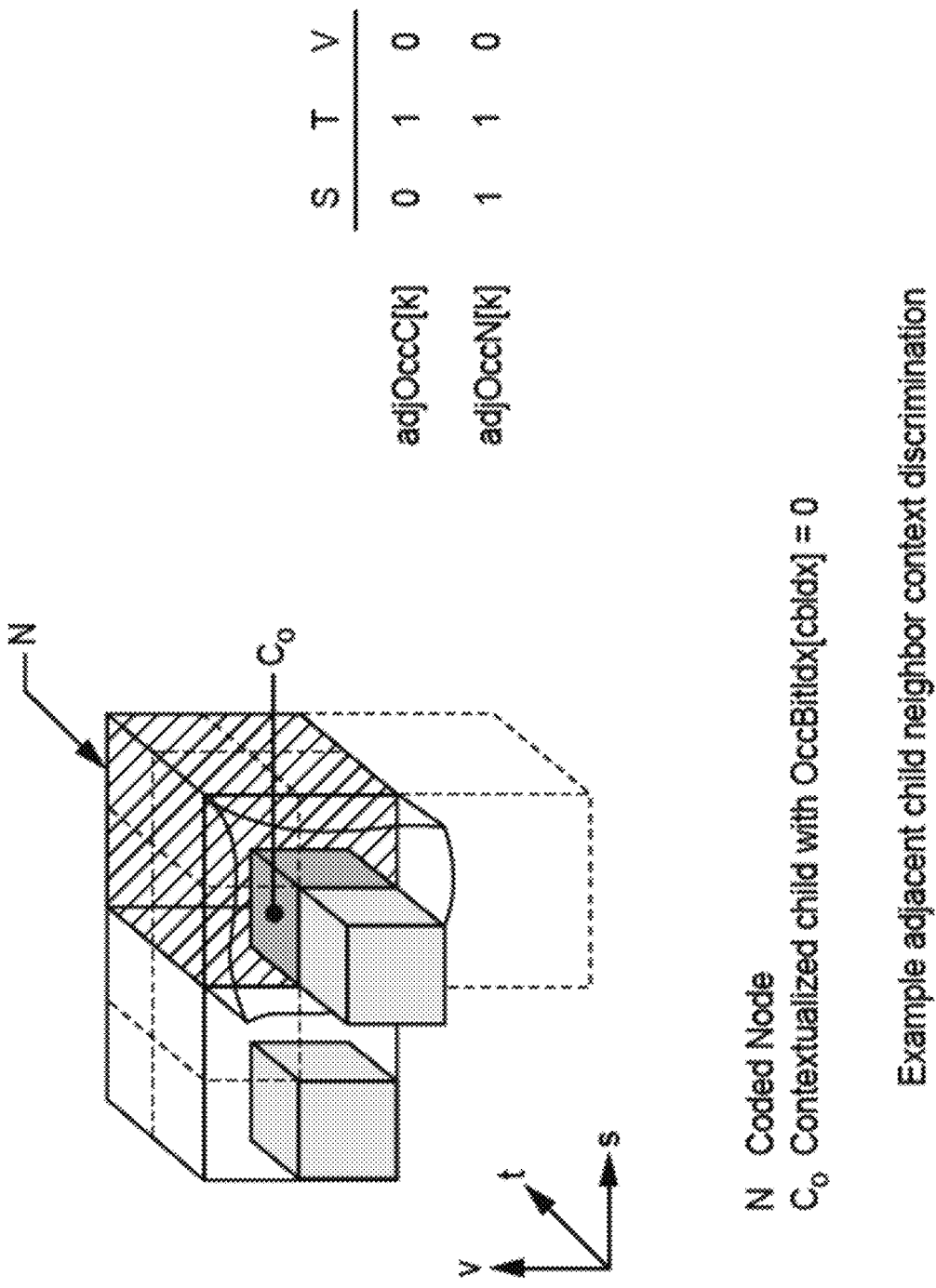
FIG. 5 is a conceptual diagram illustrating an example of an adjacent child neighbour context discrimination for use in conjunction with the techniques of the disclosure.

* FIG. 5 is a conceptual diagram illustrating an example of an adjacent child neighbour context discrimination 500. Note that FIG. 5 is referenced as "FIG. 10" in the standards section above.

The expressions adjCntN and adjCntC are the number of spatially adjacent nodes and child nodes, respectively, that are within the occupied neighbourhood availability window.

adjCntN:=adjOccN[0]+adjOccN[1]+adjOccN[2]
adjCntC:=adjOccC[0]+adjOccC[1]+adjOccC[2]

The expression adjUnocc identifies whether there exists a spatially adjacent node within the occupied neighbourhood availability window that does not have a child node spatially adjacent to the coded child.

adjUnocc:=adjCntN≠adjCntC 9.2.10.6.9 Neighbour-Predicted-Occupancy Context Discriminator General The neighbour-predicted-occupancy context discriminator shall, for eligible nodes (9.2.10.9.6.2), distinguish between three predictions for the presence of the child node coded by occupancy_bit[CbIdx]. The discriminator is specified by the expression SelPred. The three predictions are that the node is present, not present, or that it is unpredictable.

SelPred:=SelPredEligible ?OccIntraPred: 0

Eligibility

The discriminator shall only form a prediction for eligible nodes as specified by the expression SelPredEligible. Eligible nodes shall have both:
  three free axes and
  a maximum log 2 node dimension less than occtree_intra_pred_max_nodesize_log 2.

SelPredEligible:=
  OccFreeAxisCnt==3 && MaxVec(NodeSize Log 2)<occtree_intra_pred_max_nodesize_log 2

Occupancy Prediction

Figure 11:
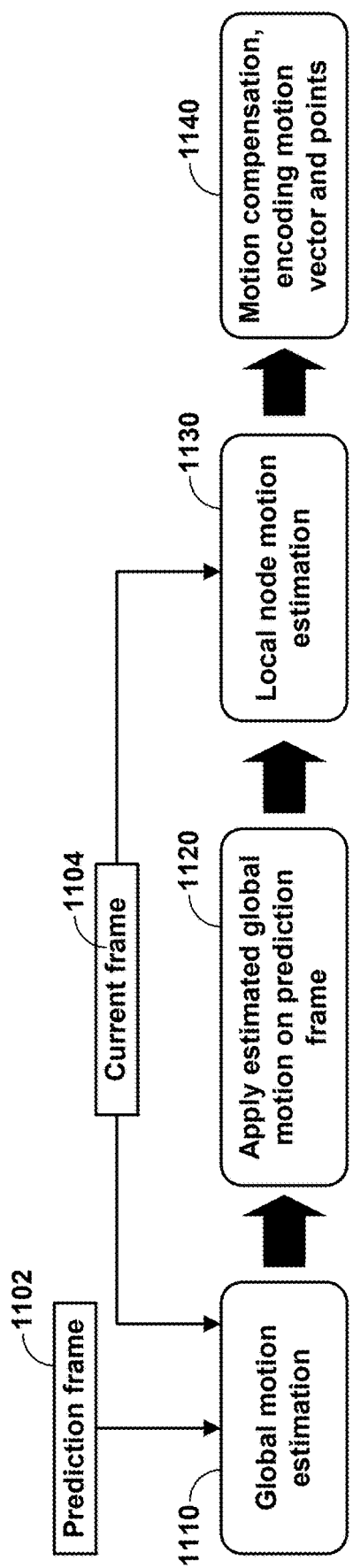
FIG. 11 a flowchart illustrating an example of motion estimation for G-PCC for use in conjunction with the techniques of the disclosure.

Occupancy prediction generates a ternary prediction for the presence of a child node identified by occupancy_bit [CbIdx] of a coded node. The prediction is specified by the expression OccIntraPred. It is based upon how many of the nodes that neighbour the coded node also adjoin the volume of the identified child node by a face, edge or corner (as illustrated by FIG. 11):

A child node shall be predicted to be not present if there are two or fewer adjoining nodes.

A child node shall be predicted to be present if there is at least a threshold number of adjoining nodes. The threshold is specified by the expression OccIntraThreshold. The threshold is four nodes unless there are more than 13 neighbouring nodes; in which case the threshold is 5 nodes.

Otherwise, the presence is unpredictable.

The size of the child node volume is half the size of the neighbour nodes' in each dimension.

OccIntraPred:=(OccAdjCnt≤2)+2×(OccAdjCnt≥OccIntraThreshold)

OccIntraThreshold:=4+(OccNeighCnt≥14)

Figure 6:
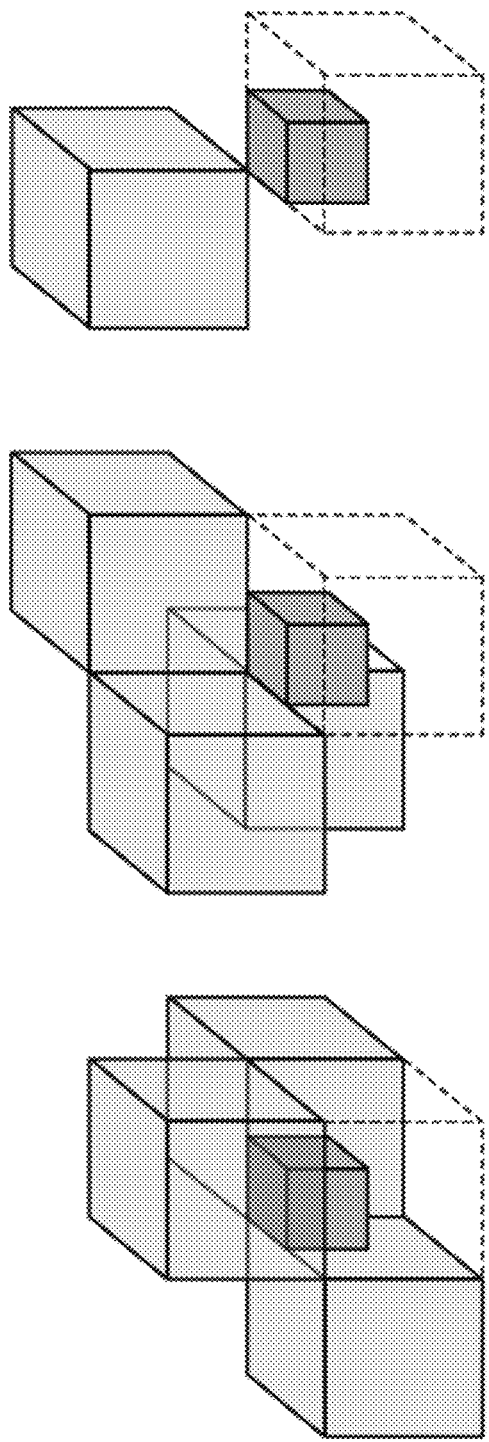
FIG. 6 is a conceptual diagram illustrating example nodes that adjoin a child node by a face, edge, or corner for use in conjunction with the techniques of the disclosure.

*FIG. 6 is a conceptual diagram illustrating example nodes 600 that adjoin a child node by a face, edge, or corner. Note that FIG. 6 is referenced as "FIG. 11" in the standards section above.

The expression OccAdj[ds][dt][dv] identifies whether a neighbouring node with a relative tree location (ds, dt, dv) to the coded node would adjoin the identified child volume.

OccAdj[ds][dt][dv]:=(OccBitIdx[CbIdx]& adjMask) ==adjLoc where adjMask:=Morton(ds≠0, dt≠0, dv≠0)

adjLoc:=Morton(ds>0, dt>0, dv>0)

The expression OccAdjCnt is the number of neighbours that adjoin the identified child volume.

OccAdjCnt:=SumN26[neighAdj]

where neighAdj[ds][dt][dv]:=OccNeigh[Ns+ds][Nt+dt][Nv+dv]&& OccAdj[ds][dt][dv]

The expression OccNeighCnt is the number of nodes that neighbour the coded node.

OccNeighCnt:=SumN26[neighRel]

where neighRel[ds][dt][dv]:=OccNeigh[Ns+ds][Nt+dt][Nv+dv]

The expression SumN26[expr] sums the result of applying expr to the relative tree location of each of the 26 possible neighbouring nodes.

SumN26[expr]

SumN26=0 for (ds=−1; ds≤1; ds++)

for (dt=−1; dt≤1; dt++)

for (dv=−1; dv≤1; dv++)

if (ds≠0 && dt≠0 && dv≠0)

SumN26+=expr[ds][dt][dv]

New Occupancy Coding for Octree Based on Dynamic OBUF

Figure 7:
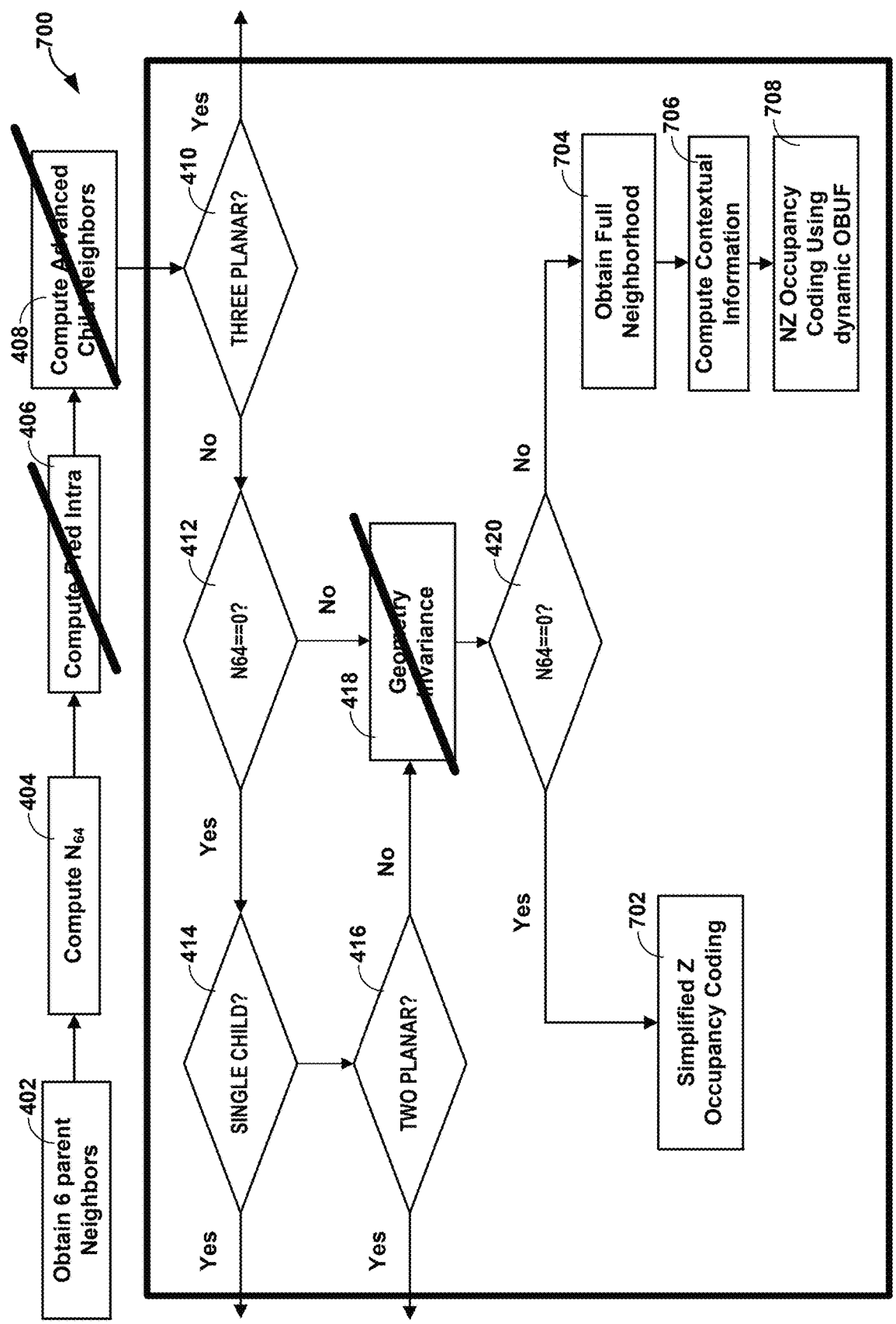
FIG. 7 is a flowchart illustrating an example of occupancy coding based on dynamic OBUF for use in conjunction with the techniques of the disclosure.

In one example of G-PCC, a new platform to encode the occupancy for octree based on dynamic OBUF was proposed. This example simplifies the octree coding encoder of some examples of G-PCC. A summary of this technique is shown in FIG. 7. FIG. 7 is a flowchart illustrating an example of occupancy coding based on dynamic OBUF process 700. Compared to the other examples of G-PCC occupancy coding, such as process 400 shown in FIG. 4, the intra prediction (compute pred intra 406), the compute advanced child neighbours process 408, and geometry invariance 418 were removed. The other processes with the same reference numerals as FIG. 4 remain the same. However, the zero (Z) and non-zero occupancy coding process after 420 have been changed. In particular, a new derivation of context with a dynamic OBUF was added for encoding the nodes which have N64 not equal to zero (No at 420), where N64 is the neighbour configuration calculated based on the occupancy of the neighbour nodes.

As shown in FIG. 7, if yes at 420, a simplified Z occupancy coding 702 is used. If no at 420, the G-PCC coder may obtain full neighborhood occupancy information (704), compute contextual information (706) from the neighborhood occupancy information, and then perform NZ occupancy coding using dynamic OBUF (708). In general, the G-PCC coder may determine a context for coding the occupancy bit of a current node from the occupancy information of neighbor nodes in the same frame.

A new derivation of contexts with a dynamic OBUF can be implemented as in FIG. 8. FIG. 8 illustrates context selection process 800 based on dynamic OBUF in occupancy coding. In this method, Word4 and Word7 values are first derived based on the occupancy information of neighbour nodes. Next, the G-PCC coder determines the primary information context ctx1 and secondary information context ctx2 using Word4 and Word7. Ctx1 and ctx2 are then used to derive the context index to encode the occupancy bit using the getEvolve function. In FIG. 8, occupancy represents the occupancy of the current node while i presents the index of the current bit to be encoded in the occupancy. The Sparse information, which indicates how sparse the occupied nodes in the neighbourhood of the point, is also derived using the occupancy of the neighbour nodes. _ctcMapOccupancy represents the entire context table to encode occupancy. _MapOccypancySparse and _MapOccupancy indicate the context index region for encoding the occupancy bit located in sparse and non-sparse areas. In the implementation, _MapOccupancySparse and _MapOccupancy are presented as tables of object for each bit index.

Figure 9:
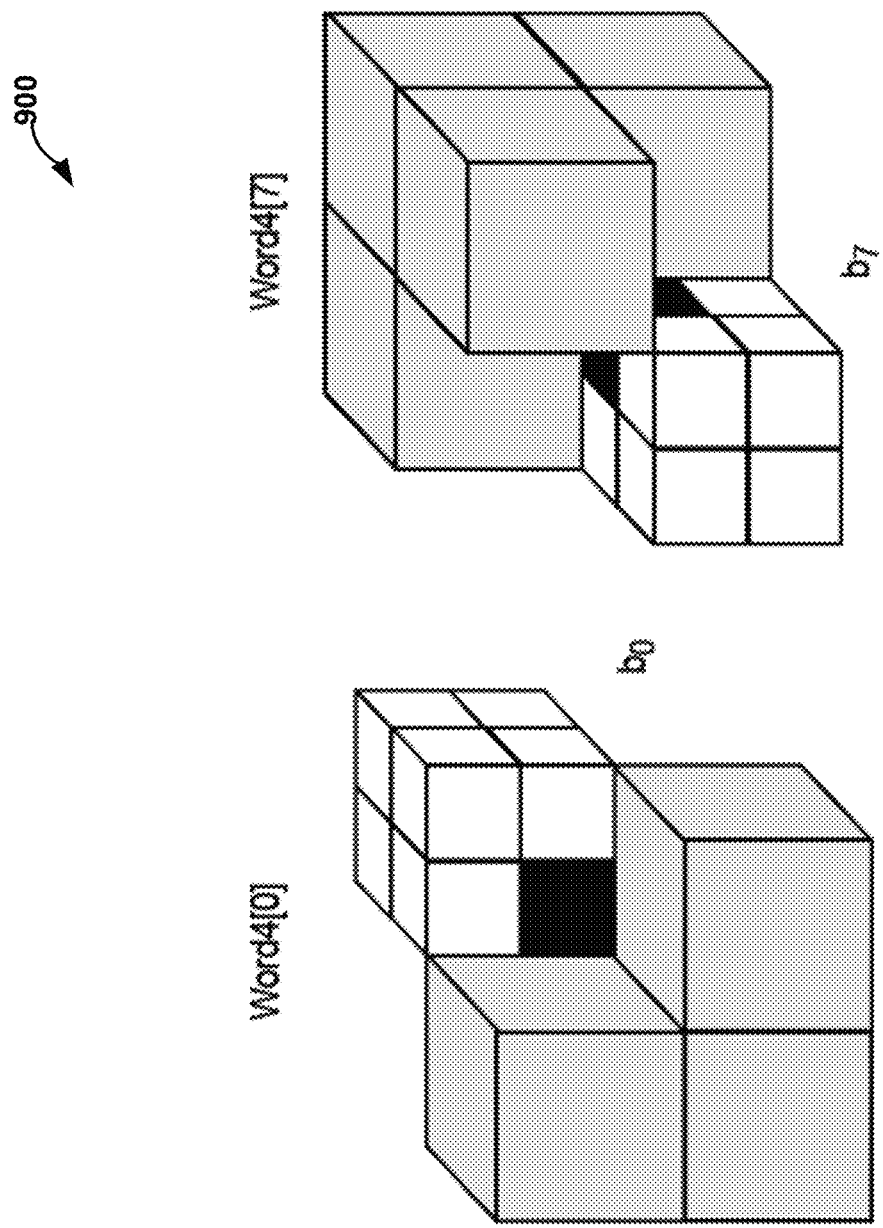
FIG. 9 is a conceptual diagram illustrating a Word4 construction example for use in conjunction with the techniques of the disclosure.

Word4 Derivation:

For each child node i, Word4[i] is constructed in a format of 4 bits. This construction is based the occupancy of 4 parent neighbours which share an edge or a vertex but not share a face with the child node i (FIG. 9). FIG. 9 is a conceptual diagram illustrating a Word4 construction example.

Sparse and Word7 Derivation:

To construct sparse and Word7 bits, three set of neighbours are used including SL, SF, and SB neighbors, as presented in FIG. 10. FIG. 10 is a conceptual diagram illustrating a process 1000 for example neighbour nodes to obtain Sparse and Word7 for the child node $b_0$.

In FIG. 10, SL (occL), SF (occF), and SB (occB) each represent the occupancy of 4 nodes from left front and bottom neighbours of parent. NN (a variable that indicates the number of neighbors) may be calculated as follows:

int NN=!!(occL & 1)+!!(occL & 2)+!!(occL & 4)+!!(occL & 8);

NN+=!!(occF & 1)+!!(occF & 2)+!!(occF & 4)+!!(occF & 8);

NN+=!!(occB & 1)+!!(occB & 2)+!!(occB & 4)+!!(occB & 8);

A child node i is in sparse area if NN is smaller than 1. Otherwise, it is marked as non-sparse. If the node i is in sparse area, its Word7 bit is represented by 9 bits; Otherwise, 12 bits.

G-PCC Motion Prediction

There are two kinds of motion used for coding point clouds in the G-PCC InterEM software: a global motion matrix and a local node motion vector. Global motion parameters are defined as a rotation matrix and translation vector which will be applied on all the points (except the points being applied local motion mode) in prediction (reference) frame. A local node motion vector of a node of the octree is a motion vector that is only applied on points within the node in prediction (reference) frame. Details of motion estimation algorithm in InterEM is described below.

FIG. 11 a flowchart illustrating an example of motion estimation for an InterEM mode. In FIG. 11, a current frame 1100 and a prediction frame 1102 are frames of point cloud data that are used as inputs to the motion prediction (e.g., inter prediction) process.

Current frame 1100 is the frame being coded and prediction frame 1102 is a reference frame (e.g., a previously coded frame) of point cloud data that is used as reference. G-PCC encoder 200 performs a global motion estimation process 1110 at a global scale using prediction frame 1102 and current frame 1104 as inputs. G-PCC encoder 200 then applies the estimated global motion on prediction frame 1102 (1120). G-PCC encoder 200 then performs local node motion estimation 1130 at a finer scale (node level in octree) using the current frame 1104 and the predicted frame with applied global motion as inputs. G-PCC encoder 200 then performs motion compensation (1140) on current frame 1104, including encoding a motion vector and points. Below, the details of algorithm are briefed.

Method to Estimate Global Motion Matrix and Translation Vector

Figure 12:
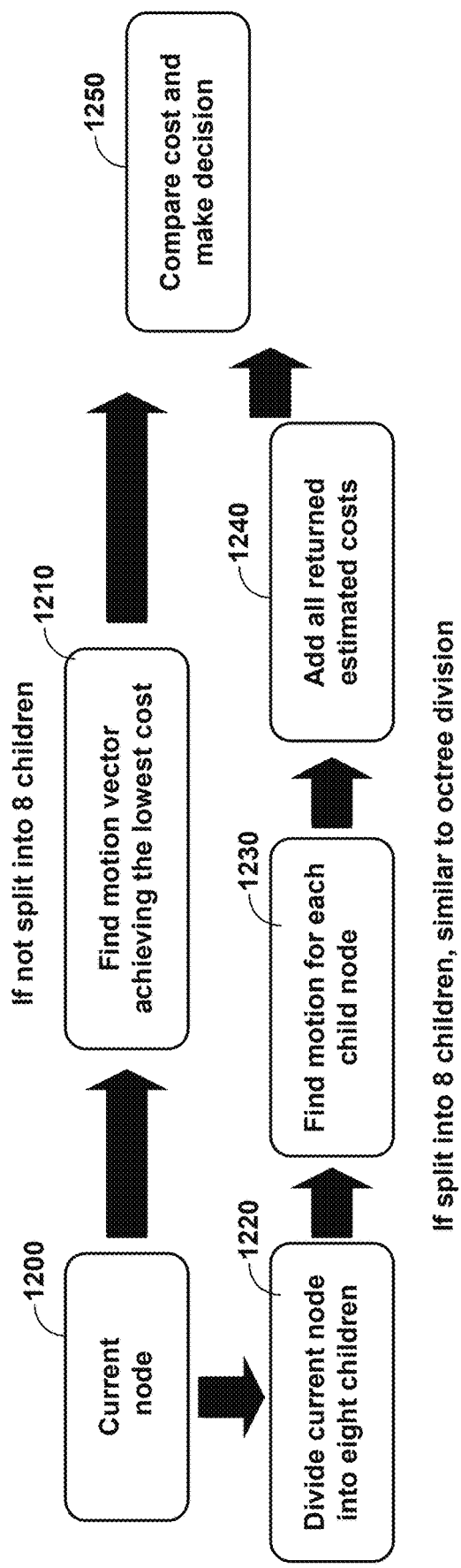
FIG. 12 a flowchart illustrating an example algorithm for estimation of a local node motion vector in G-PCC for use in conjunction with the techniques of the disclosure.

FIG. 12 a flowchart illustrating an example algorithm for estimation of a local node motion vector for a current node 1200. In FIG. 12, the motion vector is estimated in a recursive manner. The cost function used for choosing the best suitable motion vector is based on the Rate-Distortion cost.

If a current node 1200 is not split into 8 children, the motion vector that could result in the lowest cost between current node and prediction node is determined (1210). If the current node 1200 is divided into 8 children (1220), the motion estimation algorithm is applied and motion is found for each child node (1230). The total cost under split condition is obtained by adding the estimated cost value of each child node (1240). The decision whether to split or not to split is arrived by comparing the cost between splitting and not splitting (1250); if split, each sub-node is assigned its respective the motion vector (or may be further split to its children), if not split, the current node is assigned the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

EXAMPLES

Inter prediction has shown many benefits in occupancy coding in G-PCC (InterEM). However, in the occupancy coding approach that has been previously proposed, the inter predicted information is not utilized. This disclosure proposes some techniques to utilize inter prediction information in the occupancy coding using newer occupancy coding methods. This disclosure describes several methods to use inter prediction to improve occupancy coding.

In this disclosure, the occupancy of the collocated node in the motion compensated frame is denoted as preOcc, which includes 8 bits. The ith bit in preOcc represents the occupancy bit of ith child node in the reference node. The motion estimation and motion compensation used to derive the motion compensated reference frame was summarized above. In general, the number of points in the predicted node are counted for each child node to form preOcc. For each child node, if there is at least one point, the corresponding bit in preOcc is set to 1. Otherwise, it is set to 0. In this disclosure, $p_i$ is the collocated reference child node of ith child node in the current node.

8.1 Using the Occupancy of the Reference Node to have Adaptive Context Selection for Occupancy of the Current Node In this example of the disclosure, the occupancy bit of the ith child node in a reference node may be used to determine the context that is used to entropy encode/decode (e.g., arithmetically encode/decode) the occupancy bit of ith node in the current node. In one example, G-PCC encoder 200 and/or G-PCC decoder 300 may be configured to determine an occupancy bit of an ith child node in a reference node. In some examples, the reference child node is collated with the current child node. The reference node is in a reference frame of point cloud data used for inter prediction of a current node in a current frame of the point cloud data.

G-PCC encoder 200 and/or G-PCC decoder 300 may be further configured to determine a context (e.g., from among a plurality of contexts) for coding a current occupancy bit of an ith node of a current node based on the occupancy bit of the ith child node in the reference mode, and arithmetic code the current occupancy bit using the determined context.

FIG. 13 is a conceptual diagram illustrating an example of context selection based on the occupancy of a collocated reference child node for use in conjunction with the techniques of the disclosure. FIG. 13 shows a simplified versions of a current node 1300 in a current frame of point cloud data and a reference node 1350 in a reference node point cloud data. Current node 1300 includes 4 child nodes and reference node 1350 includes 4 reference child nodes that are collocated with the 4 child nodes of current node 1300. That is, the reference child nodes are in the same position of reference frame as the child nodes in the current frame. It should be understood that FIG. 13 is a simplified example, and that nodes of point cloud data may include more child nodes.

The context used for arithmetically coding the occupancy bit of child node 1302 is based on the value of the occupancy bit of collocated reference child node 1352. Likewise, the occupancy bit of child node 1304 is based on the value of the occupancy bit of collocated reference child node 1354. In the example of FIG. 13, reference child node 1352 has an occupancy bit value of 1, indicating that reference child node 1352 is occupied. Reference child node 1354 has an occupancy bit value 0, indicating the reference child node 1354 is not occupied. In accordance with the techniques of this disclosure, the occupancy bit of child node 1302 would be coded with a different context from that of child node 1304 given that their respective collocated reference child nodes have different values for their occupancy bits.

In other examples, the occupancy of the reference child node may not correspond to a signalled syntax element. For example, the reference frame may have an octree structure that is not aligned with the current frame, or, due to motion compensation, the points may be modified and they would no longer correspond to an octree structure.

Instead, in another example of the disclosure, G-PCC decoder 300 may analyze the collocated region corresponding to the current child node. The child node may have a width, height, and depth w, h, d at location x0, y0, z0. Then, the reference child node is considered as a node in the reference frame with the same w, h, and d and the same location (here the location x0, y0, z0 is with respect to a common origin point). Then the occupancy of the reference child node is obtained by counting the number of points of the reference frame in the reference child node region.

As such, to determine the occupancy of the reference child node, a G-PCC coder may determine the occupancy of the reference child node by checking the number of points included in the reference child node.

In one example, the integration of the techniques to one framework for G-PCC using dynamic OBUF may be presented as follows. Additions to previous code are shown between the tags <Add> and </Add>. Removals relative to previous code are shown between the tags <Del> and </Del>

At the encoder (geometry_octree_encoder.cpp):
// The following function is to encode occupancy of a node when N64 is non-zero
void
GeometryOctreeEncoder::encodeOccupancyFullNeihbourgsNZ(
    int neighPattern,
    int occupancy,
    int Word4[8],
    int Word7Adj[8],
    bool Sparse[8],
    int planarMaskX,
    int planarMaskY,
    int planarMaskZ,
    bool planarPossibleX,
    bool planarPossibleY,
    bool planarPossibleZ
    <Add>int predOcc</Add>// Take the occ of the reference node as an input
)
{
...
// encode
int bit=(occupancy>>i) & 1; // i is the position index of the child node to be encoded
<Add>int interCtx=(predOcc>>i) & 1; </Add>// the inter context based using the occupancy of the ith child in the reference node.
if (Sparse[i]) {
    ctx2|(Word7Adj[i]& 31)<<6;
    int    ctx1=((Word7Adj[i]>>5)<<i)|partialOccupancy;
    _arithmeticEncoder->encode(bit,
_ctxMapOccupancy[_MapOccupancySparse<Add>[interCtx]</Add>[i].getEvolve(bit, ctx2, ctx1)]);
}else {
    ctx2|(Word7Adj[i]& 7)<<6;
    int    ctx1=((Word7Adj[i]>>3)<<i)    partialOccupancy;
    _arithmeticEncoder->encode(bit, _ctxMapOccupancy[_MapOccupancy<Add>[interCtx]</Add>[i].getEvolve(bit, ctx2, ctx1)]);
}
...
}

The map occupancy is defined as follows:
CtxMapOccupancy_MapOccupancy<Add>[2]</Add>[8]; //2: reference child node is occupied or not, 8: bit position
CtxMapOccupancy_MapOccupancySparse<Add>[2]</Add>[8];
// The following function is to encode occupancy of a node when N64 is zero void
GeometryOctreeEncoder::encodeOccupancyNeighZsimple(
    int mappedOccupancy,
    int mappedPlanarMaskX,
    bool planarPossibleX,
    int mappedPlanarMaskY,
    bool planarPossibleY,
    int mappedPlanarMaskZ,
    bool planarPossibleZ
    Add>int predOcc</Add>
)
{
// NB: if not predicted, minimuum num occupied is 2 due to singleChild
<Add>int minOccupied=predOcc ?1:2;
int threshold=8-minOccupied; </Add>
int numOccupiedAcc=0;
int maxPerPlaneX=mappedPlanarMaskX ?2:3;
int maxPerPlaneY=mappedPlanarMaskY ?2:3;
int maxPerPlaneZ=mappedPlanarMaskZ ?2:3;
bool    sure_planarityX=mappedPlanarMaskX||!planarPossibleX;
bool    sure_planarityY=mappedPlanarMaskY||!planarPossibleY;
bool    sure_planarityZ=mappedPlanarMaskZ||!planarPossibleZ;
int maskedOccupancy=
    mappedPlanarMaskX|mappedPlanarMaskY|mappedPlanarMaskZ;
int MaskConfig=!mappedPlanarMaskX ?0:mappedPlanarMaskX==15 ?1:2;
MaskConfig+=!mappedPlanarMaskY ?0:mappedPlanarMaskY==51 ?3:6;
MaskConfig+=!mappedPlanarMaskZ ?0:mappedPlanarMaskZ==85 ?9:18;
static const int LUinit[27][6]={
    {0, 0, 0, 0, 0, 0}, {4, 0, 2, 2, 2, 2}, {0, 4, 2, 2, 2, 2},
    {2, 2, 4, 0, 2, 2}, {4, 2, 4, 2, 3, 3}, {2, 4, 4, 2, 3, 3},
    {2, 2, 0, 4, 2, 2}, {4, 2, 2, 4, 3, 3}, {2, 4, 2, 4, 3, 3},
    {2, 2, 2, 2, 4, 0}, {4, 2, 3, 3, 4, 2}, {2, 4, 3, 3, 4, 2},
    {3, 3, 4, 2, 4, 2}, {4, 3, 4, 3, 4, 3}, {3, 4, 4, 3, 4, 3},
    {3, 3, 2, 4, 4, 2}, {4, 3, 3, 4, 4, 3}, {3, 4, 3, 4, 4, 3},
    {2, 2, 2, 2, 0, 4}, {4, 2, 3, 3, 2, 4}, {2, 4, 3, 3, 2, 4},
    {3, 3, 4, 2, 2, 4}, {4, 3, 4, 3, 3, 4}, {3, 4, 4, 3, 3, 4},
    {3, 3, 2, 4, 2, 4}, {4, 3, 3, 4, 3, 4}, {3, 4, 3, 4, 3, 4}};
const int* vinit=LUinit[MaskConfig];
int coded0[6]={vinit[0], vinit[1], vinit[2],
    vinit[3], vinit[4], vinit[5]}; // mask x0 x1 y0 y1 z0 z1
for (int i=0; i<8; i++){
// masking for planar is here
if ((maskedOccupancy>>i) & 1)
    continue;
// -- avoid coding the occupancyBit if it is implied.
// if predOcc, the single node signalling is not allowed. Therefore, when predOcc is non-zero, the node can be single and the number of implied bit can be 1 or coded0[0]+coded0[1]>=7 instead of coded0[0]+coded0[1]>=6 when predOcc=0.
int mask0X=(0xf0>>i) & 1;
bool    bitIsOneX=(sure_planarityX && coded0 [mask0X]>=maxPerPlaneX)

```
            ||(coded0[0]+coded0[1]>=Add>threshold
                </Add><Del>6</DEL>);
        int mask0Y=2+((0xcc>>i) & 1);
        bool    bitIsOneY=(sure_planarityY    &&    coded0
            [mask0Y]>=maxPerPlaneY)
            ||(coded0[0]+coded0[1]>=Add>threshold
                </Add><Del>6</DEL>);
        int mask0Z=4+((0xaa>>i) & 1);
        bool    bitIsOneZ=(sure_planarityZ    &&    coded0
            [mask0Z]>=maxPerPlaneZ)
            ||(coded0[0]+coded0[1]>=Add>threshold
                </Add><Del>6</DEL>);
        <Add>int interCtx=(predOcc>>i) & 1; </Add>
        int bit=(mappedOccupancy>>i) & 1;
        if (!(bitIsOneX||bitIsOneY||bitIsOneZ)) {
            _arithmeticEncoder->encode(bit, _ctxZ[i][numOc-
                cupiedAcc]<Add>[interCtx]</Add>);
            coded0[mask0X]+=!bit;
            coded0[mask0Y]+=!bit;
            coded0[mask0Z]+=!bit;
        }
        numOccupiedAcc+=bit;
    }
}
ctxZ is the context table to encode the occupancy when
NN64 is equal to 0. ctxZ is defined in geometry_octree.h file
as follow:
AdaptiveBitModel_ctxZ[8][7]<Add>[2]</Add>;
At the decoder, geometry_octree_decoder.cpp file may be
modified accordingly as follows:
    uint32_t
GeometryOctreeDecoder::decodeOccupancyFullNeih-
bourgs(
    int neighPattern,
    int planarMaskX,
    int planarMaskY,
    int planarMaskZ,
    bool planarPossibleX,
    bool planarPossibleY,
    bool planarPossibleZ,
    const MortonMap3D& occupancyAtlas,
    Vec3<int32_t>pos,
    const int atlasShift,
    bool flagWord4,
    bool adjacent_child_contextualization_enabled_flag
#if INTER_EM_VERSION3,
    int predOcc,
    int predOccStrong
#endif
)
{
    // decode occupancy pattern
    uint32_t occupancy;
    // single child and we know its position
    if (planarMaskX && planarMaskY && planarMaskZ) {
        uint32_t cnt=(planarMaskZ & 1);
        cnt|=(planarMaskY & 1)<<1;
        cnt|=(planarMaskX & 1)<<2;
        occupancy=1<<cnt;
        return occupancy;
    }
    // neighbour empty and only one point=>decode index,
        not pattern
    //------Z occupancy decoding from here----------------
    if (neighPattern==0
        <Add>&&    (!predOcc||(planarMaskX|planarMaskY-
            |planarMaskZ))</Add>) {//
```

The condition for coding the single node or not, using the neighPattern and inter prediction and planar information
```
        bool singleChild=false;
        if (planarPossibleX && planarPossibleY && planarPos-
            sibleZ) {
            singleChild=_arithmeticDecoder->decode(_ctxSingle-
                Child)==1;
        }
        if (singleChild) {
            uint32_t cnt;
            if (!planarMaskZ)
                cnt=_arithmeticDecoder->decode( );
            else
                cnt=(planarMaskZ & 1);
            if (!planarMaskY)
                cnt|=_arithmeticDecoder->decode( )<<1;
            else
                cnt|(planarMaskY & 1)<<1;
            if (!planarMaskX)
                cnt|=_arithmeticDecoder->decode( )<<2;
            else
                cnt (planarMaskX & 1)<<2;
            occupancy=1<<cnt;
            return occupancy;
        }
        // at least two child nodes occupied and two planars=>we
            know the occupancy
        if (planarMaskX && planarMaskY) {
            uint32_t cnt=((planarMaskX & 1)<<2) ((planarMaskY
                & 1)<<1);
            occupancy=(1<<cnt)|(1<<(cnt+1));
            return occupancy;
        }
        if (planarMaskY && planarMaskZ) {
            uint32_t cnt=((planarMaskY & 1)<<1) (planarMaskZ
                & 1);
            occupancy=(1<<cnt)|(1<<(cnt+4));
            return occupancy;
        }
        if (planarMaskX && planarMaskZ) {
            uint32_t cnt=((planarMaskX & 1)<<2)|(planarMaskZ
                & 1);
            occupancy=(1<<cnt)|(1<<(cnt+2));
            return occupancy;
        }
        return decodeOccupancyNeighZsimple(
            planarMaskX, planarPossibleX, planarMaskY, planar-
                PossibleY, planarMaskZ, planarPossibleZ
#if INTER_EM_VERSION3
            ,
            predOcc, predOccStrong
#endif
        );
    } else {//------NZ    occupancy    decoding    from    here
        ----------------
        int Word4[8]1 {0, 0, 0, 0, 0, 0, 0, 0}; // occupancy pattern
            for 3 edges+1 vertex
        int Word7Adj[8]={
            0, 0, 0, 0, 0,
            0, 0, 01; //7 bits: 0=FaceL 1=FaceF 2=FaceB/3=Ed-
                geLF 4=EdgeLB 5=Edge FB/6=VertexLFB
        bool Sparse[8]10, 0, 0, 0, 0, 0, 0, 01;
        if (flagWord4) {
            construct26NeighbourWord(occupancyAtlas,    pos,
                atlasShift, Word4);
            if (adjacent_child_contextualization_enabled_flag)
                makeGeometryAdvancedNeighPattern(
                    neighPattern, pos, atlasShift, occupancyAtlas,
                    Word7Adj, Sparse);
        }
```

```
    return decodeOccupancyFullNeihbourgsNZ(
        neighPattern, Word4, Word7Adj, Sparse, planar-
            MaskX, planarMaskY,
        planarMaskZ, planarPossibleX, planarPossibleY, pla-
            narPossibleZ, <Add>predOcc</Add>
    );
  }
}
uint32_t
GeometryOctreeDecoder::decodeOccupancyFullNeih-
bourgsNZ(
    int neighPattern,
    int Word4[8],
    int Word7Adj[8],
    bool Sparse[8],
    int planarMaskX,
    int planarMaskY,
    int planarMaskZ,
    bool planarPossibleX,
    bool planarPossibleY,
    bool planarPossibleZ
    <Add>int predOcc</Add>
)
{
    static const int LUTinitCoded0[27][6]{
        {0, 0, 0, 0, 0, 0}, {4, 0, 2, 2, 2, 2}, {0, 4, 2, 2, 2, 2},
        {2, 2, 4, 0, 2, 2}, {4, 2, 4, 2, 3, 3}, {2, 4, 4, 2, 3, 3},
        {2, 2, 0, 4, 2, 2}, {4, 2, 2, 4, 3, 3}, {2, 4, 2, 4, 3, 3},
        {2, 2, 2, 2, 4, 0}, {4, 2, 3, 3, 4, 2}, {2, 4, 3, 3, 4, 2},
        {3, 3, 4, 2, 4, 2}, {4, 3, 4, 3, 4, 3}, {3, 4, 4, 3, 4, 3},
        {3, 3, 2, 4, 4, 2}, {4, 3, 3, 4, 4, 3}, {3, 4, 3, 4, 4, 3},
        {2, 2, 2, 2, 0, 4}, {4, 2, 3, 3, 2, 4}, {2, 4, 3, 3, 2, 4},
        {3, 3, 4, 2, 2, 4}, {4, 3, 4, 3, 3, 4}, {3, 4, 4, 3, 3, 4},
        {3, 3, 2, 4, 2, 4}, {4, 3, 3, 4, 3, 4}, {3, 4, 3, 4, 3, 41}};
    static const int LUTw[16]={7, 7, 7, 7, 7, 7, 7, 7, 7, 7, 7,
        7, 7, 7, 3, 6};
    static const int LUTmask[16]={2, 1, 8, 4, 2, 1, 2, 1, 4, 2,
        2, 1, 1, 4, 1, 1};
// ------ occupancy decoding from here ----------------
    bool sure_planarityX=planarMaskX||!planarPossibleX;
    bool sure_planarityY=planarMaskY||!planarPossibleY;
    bool sure_planarityZ=planarMaskZ||!planarPossibleZ;
    int   MaskConfig=!planarMaskX ?0:planarMaskX==15
        ?1:2;
    MaskConfig+=!planarMaskY ?0:planarMaskY==51 ?3:6;
    MaskConfig+=!planarMaskZ    ?0:planarMaskZ==85
        ?9:18;
    const int* vinit=LUTinitCoded0[MaskConfig];
    int coded0[6]={vinit[0], vinit[1], vinit[2],
        vinit[3], vinit[4], vinit[5]}; // mask x0 x1 y0 y1 z0 z1
// loop on occupancy bits from occupancy map
    uint32_t partialOccupancy=0;
    uint32_t occupancy=0;
    int maskedOccupancy=planarMaskX|planarMaskY| pla-
        narMaskZ;
    for (int i=0; i<8; i++) {
      if (
          (maskedOccupancy>>i)
          & 1) {// bit is 0 because masked by QTBT or planar
        partialOccupancy<<=1;
        continue;
      }
      int mask0X=(0xf0>>i) & 1;
      bool bitIsOneX=
          (sure_planarityX && coded0[mask0X]>=3)||(coded0
              [0]+coded0[1]>=7);
      int mask0Y=2+((0xcc>>i) & 1);
      bool bitIsOneY=
          (sure_planarityY && coded0[mask0Y]>=3) (coded0
              [2]+coded0[3]>=7);
      int mask0Z=4+((0xaa>>i) & 1);
      bool bitIsOneZ=
          (sure_planarityZ && coded0[mask0Z]>=3) (coded0
              [4]+coded0[5]>=7);
      if (
          bitIsOneX||bitIsOneY
          ||bitIsOneZ) {// bit is 1 because the rest of occupancy
            must be all 1
        occupancy+=1<<i;
        partialOccupancy<<=1;
        partialOccupancy|=1;
        continue;
      }
      <Add>int interCtx=(predOcc>>i) & 1; </Add>// Take the
          context based on the occ of the collocated child node in
          the reference node
      // OBUF contexts
      int comp=i<<1;
      int     ctxComp=!(Word4[LUTw[comp]]&       LUTmask
          [comp++])<<1;
      ctxComp|=!(Word4[LUTw[comp]]&             LUTmask
          [comp++]);
      int ctx2=(Word4[i]<<2)| ctxComp;
      ctx2|=(Word7Adj[i]& 7)<<6;
      int ctx1=((Word7Adj[i]>>3)<<i)|partialOccupancy;
      // decode
      int bit;
      if (Sparse[i]) {
        ctx2|=(Word7Adj[i]& 31)<<6;
        int ctx1=((Word7Adj[i]>>5)<<i)|partialOccupancy;
        bit=_arithmeticDecoder->decode(
            _ctxMapOccupancy[_MapOccupancySparse<Add>
                [interCtx]</Add>[i].get(ctx2, ctx1)]);
        _MapOccupancySparse[interCtx][i].evolve(bit,
            ctx2, ctx1);
      }else {
        ctx2|=(Word7Adj[i]& 7)<<6;
        int ctx1=((Word7Adj[i]>>3)<<i)|partialOccupancy;
        bit=_arithmeticDecoder->decode(
            _ctxMapOccupancy[_MapOccupancy[interCtx][i]
                .get(ctx2, ctx1)]);
        _MapOccupancy<Add>[interCtx]</Add>[i].evolve
            (bit, ctx2, ctx1);
      }
      // update partial occupancy of current node
      occupancy+=bit<<i;
      coded0[mask0X]+=!bit;
      coded0[mask0Y]+=!bit;
      coded0[mask0Z]+=!bit;
      partialOccupancy<<=1;
      partialOccupancy|=bit;
    }
    return occupancy;
}
int
GeometryOctreeDecoder::decodeOccupancyNeighZsimple(
    int mappedPlanarMaskX,
    bool planarPossibleX,
    int mappedPlanarMaskY,
    bool planarPossibleY,
```

```
    int mappedPlanarMaskZ,
    bool planarPossibleZ
#if INTER_EM_VERSION3
    ,
    int predOcc,
    int predOccStrong
#endif
)
{
    // NB: if not predicted, minimum num occupied is 2 due
    to singleChild
    <Add> int minOccupied=predOcc ?1:2;
    int threshold=8-minOccupied; </Add>
// if predOcc, the single node signalling is not allowed.
Therefore, when <Add>predOcc</Add>is predOcc is non-
zero, the node can be single and the number of implied bit
can be 1.
    int numOccupiedAcc=0;
    int occupancy=0;
    int maxPerPlaneX=mappedPlanarMaskX ?2:3;
    int maxPerPlaneY=mappedPlanarMaskY ?2:3;
    int maxPerPlaneZ=mappedPlanarMaskZ ?2:3;
    bool    sure_planarityX=mappedPlanarMaskX||!planar-
        PossibleX;
    bool    sure_planarityY=mappedPlanarMaskY||!planar-
        PossibleY;
    bool    sure_planarityZ=mappedPlanarMaskZ||!planar-
        PossibleZ;
    int maskedOccupancy=
        mappedPlanarMaskX|mappedPlanarMaskY|mapped-
            PlanarMaskZ;
    int MaskConfig=!mappedPlanarMaskX ?0:mappedPla-
        narMaskX==15 ?1:2;
    MaskConfig+=!mappedPlanarMaskY ?0:mappedPlanar-
        MaskY==51 ?3:6;
    MaskConfig+=!mappedPlanarMaskZ ?0:mappedPlanar-
        MaskZ==85 ?9:18;
    static const int LUinit[27][6]={
        {0, 0, 0, 0, 0, 0}, {4, 0, 2, 2, 2, 2}, {0, 4, 2, 2, 2, 2},
        {2, 2, 4, 0, 2, 2}, {4, 2, 4, 2, 3, 3}, {2, 4, 4, 2, 3, 3},
        {2, 2, 0, 4, 2, 2}, {4, 2, 2, 4, 3, 3}, {2, 4, 2, 4, 3, 3},
        {2, 2, 2, 2, 4, 0}, {4, 2, 3, 3, 4, 2}, {2, 4, 3, 3, 4, 2},
        {3, 3, 4, 2, 4, 2}, {4, 3, 4, 3, 4, 3}, {3, 4, 4, 3, 4, 3},
        {3, 3, 2, 4, 4, 2}, {4, 3, 3, 4, 4, 3}, {3, 4, 3, 4, 4, 3},
        {2, 2, 2, 2, 0, 4}, {4, 2, 3, 3, 2, 4}, {2, 4, 3, 3, 2, 4},
        {3, 3, 4, 2, 2, 4}, {4, 3, 4, 3, 3, 4}, {3, 4, 4, 3, 3, 4},
        {3, 3, 2, 4, 2, 4}, {4, 3, 3, 4, 3, 4}, {3, 4, 3, 4, 3, 4}};
    const int* vinit=LUinit[MaskConfig];
    int coded0[6]={vinit[0], vinit[1], vinit[2],
        vinit[3], vinit[4], vinit[5]}; // mask x0 x1 y0 y1 z0 z1
    for (int i=0; i<8; i++) {
        if ((maskedOccupancy>>i) & 1)
            continue;
        // NB: There must be at least two occupied child nodes
        // -- avoid coding the occupancy bit if it is implied.
            int mask0X=(0xf0>>i) & 1;
            bool    bitIsOneX=(sure_planarityX    &&    coded0
                [mask0X]>=maxPerPlaneX)
                ||(coded0[0]+coded0[1]>=<Add>threshold
                    </Add><Del>6</Del>);
            int mask0Y=2+((0xcc>>i) & 1);
            bool    bitIsOneY=(sure_planarityY    &&    coded0
                [mask0Y]>=maxPerPlaneY)
                ||(coded0[0]+coded0[1]>=<Add>threshold
                    </Add><Del>6</Del>);
            int mask0Z=4+((0xaa>>i) & 1);
        bool bitIsOneZ=(sure_planarityZ && coded0[mask0Z]
            >=maxPerPlaneZ)
            ||(coded0[0]+coded0[1]>=(Add>threshold
                </Add><Del>6</Del>);
        // masking for planar is here
        int bit=1;
        if (!(bitIsOneX||bitIsOneY||bitIsOneZ)) {
            <Add>int interCtx=(predOcc>>i) & 1; </Add>// context
                based on the occupancy bit of collocated node
            bit=_arithmeticDecoder->decode(_ctxZ[i][numOccu-
                piedAcc](Add>[interCtx]</Add>);
            coded0[mask0X]+=!bit;
            coded0[mask0Y]+=!bit;
            coded0[mask0Z]+=!bit;
        }
        numOccupiedAcc+=bit;
        occupancy I=bit<<i;
    }
    return occupancy;
}
uint32_t
GeometryOctreeDecoder::decodeOccupancyFullNeih-
bourgs(
    int neighPattern,
    int planarMaskX,
    int planarMaskY,
    int planarMaskZ,
    bool planarPossibleX,
    bool planarPossibleY,
    bool planarPossibleZ,
    const MortonMap3D& occupancyAtlas,
    Vec3<int32_t>pos,
    const int atlasShift,
    bool flagWord4,
    bool adjacent_child_contextualization_enabled_flag
#if INTER_EM_VERSION3
    ,
    int predOcc,
    int predOccStrong
#endif
)
{
    // decode occupancy pattern
    uint32_t occupancy;
    // single child and we know its position
    if (planarMaskX && planarMaskY && planarMaskZ) {
        uint32_t cnt=(planarMaskZ & 1);
        cnt|=(planarMaskY & 1)<<1;
        cnt|=(planarMaskX & 1)<<2;
        occupancy=1<<cnt;
        return occupancy;
    }
// neighbour empty and only one point=>decode index, not
pattern
//------Z occupancy decoding from here----------------
// singleChild may be implicitly signalled using the occu-
pancy of the reference node
if (neighPattern == 0
    <Add>&&    (!predOcc||(planarMaskX|planarMaskY|pla-
        narMaskZ))</Add>) {
    bool singleChild=false;
    if (planarPossibleX && planarPossibleY && planarPos-
        sibleZ) {
        singleChild=_arithmeticDecoder->decode(_ctxSingle-
            Child)==1;
    }
```

```
if (singleChild) {
  uint32_t cnt;
  if (!planarMaskZ)
    cnt=_arithmeticDecoder->decode( );
  else
    cnt=(planarMaskZ & 1);
  if (!planarMaskY)
    cnt|=_arithmeticDecoder->decode( )<<1;
  else
    cnt|=(planarMaskY & 1)<<1;
  if (!planarMaskX)
    cnt|=_arithmeticDecoder->decode( )<<2;
  else
    cnt|=(planarMaskX & 1)<<2;
  occupancy=1<<cnt;
  return occupancy;
}
// at least two child nodes occupied and two planars=>we
    know the occupancy
if (planarMaskX && planarMaskY) {
  uint32_t cnt=((planarMaskX & 1)<<2)|((planarMaskY
      & 1)<<1);
  occupancy=(1<<cnt) (1<<(cnt+1));
  return occupancy;
}
if (planarMaskY && planarMaskZ) {
  uint32_t cnt=((planarMaskY & 1)<<1)|(planarMaskZ
      & 1);
  occupancy=(1<<cnt)|(1<<(cnt+4));
  return occupancy;
}
if (planarMaskX && planarMaskZ) {
  uint32_t cnt=((planarMaskX & 1)<<2)|(planarMaskZ
      & 1);
  occupancy=(1<<cnt)|(1<<(cnt+2));
  return occupancy;
}
return decodeOccupancyNeighZsimple(
  planarMaskX, planarPossibleX, planarMaskY, planar-
      PossibleY, planarMaskZ,
  planarPossibleZ
  Add>predOcc</Add>
);
}else {//------NZ occupancy decoding from here
---------------
  int Word4[8]={0, 0, 0, 0,
    0, 0, 0, 0}; // occupancy pattern for 3 edges+1 vertex
  int Word7Adj[8]={
    0, 0, 0, 0, 0,
    0, 0, 0}; // 7 bits: 0=FaceL 1=FaceF 2=FaceB/3=Ed-
        geLF 4=EdgeLB 5=Edge FB/6=VertexLFB
  bool Sparse[8]10, 0, 0, 0, 0, 0, 0, 0};
  if (flagWord4) {
    construct26NeighbourWord(occupancyAtlas,    pos,
        atlasShift, Word4);
    if (adjacent_child_contextualization_enabled_flag)
      makeGeometryAdvancedNeighPattern(
        neighPattern, pos, atlasShift, occupancyAtlas,
          Word7Adj, Sparse);
  }
  return decodeOccupancyFullNeihbourgsNZ(
    neighPattern, Word4, Word7Adj, Sparse, planar-
        MaskX, planarMaskY,
    planarMaskZ, planarPossibleX, planarPossibleY, pla-
        narPossibleZ, <Add>predOcc</Add>
    );
}
```

It should be noted that, in the intra coded frames, predOcc is always 0. Hence, in one example, the proposed techniques make no change in the intra coded frames.

8.2 Using Occupancy of the Sibling Nodes of the Collocated Node in the Reference Frame to Select the Context to Encode the Occupancy of the Current Node In this example of the disclosure, the occupancy of the sibling nodes of the collocated node in the reference frame is used to determine the context to encode the occupancy of the current node. In one example, G-PCC encoder 200 and/or G-PCC decoder may be configured to determine an occupancy bit of a sibling node of a collocated node in a reference frame, determine a context for coding a current occupancy bit a current node based on the occupancy bit of the sibling node of the collocated node in the reference frame, and arithmetic code the current occupancy bit using the context.

In some examples, Word7 and Word4 values are constructed using the neighbour information. They may contain redundant information.

In this example of the disclosure, a Word4 value may be constructed using the same techniques in previous contributions for the intra coded frames. However, in the inter coded frames, the occupancy of the child nodes in the reference node may be used to construct a Word4 value.

Figure 14:
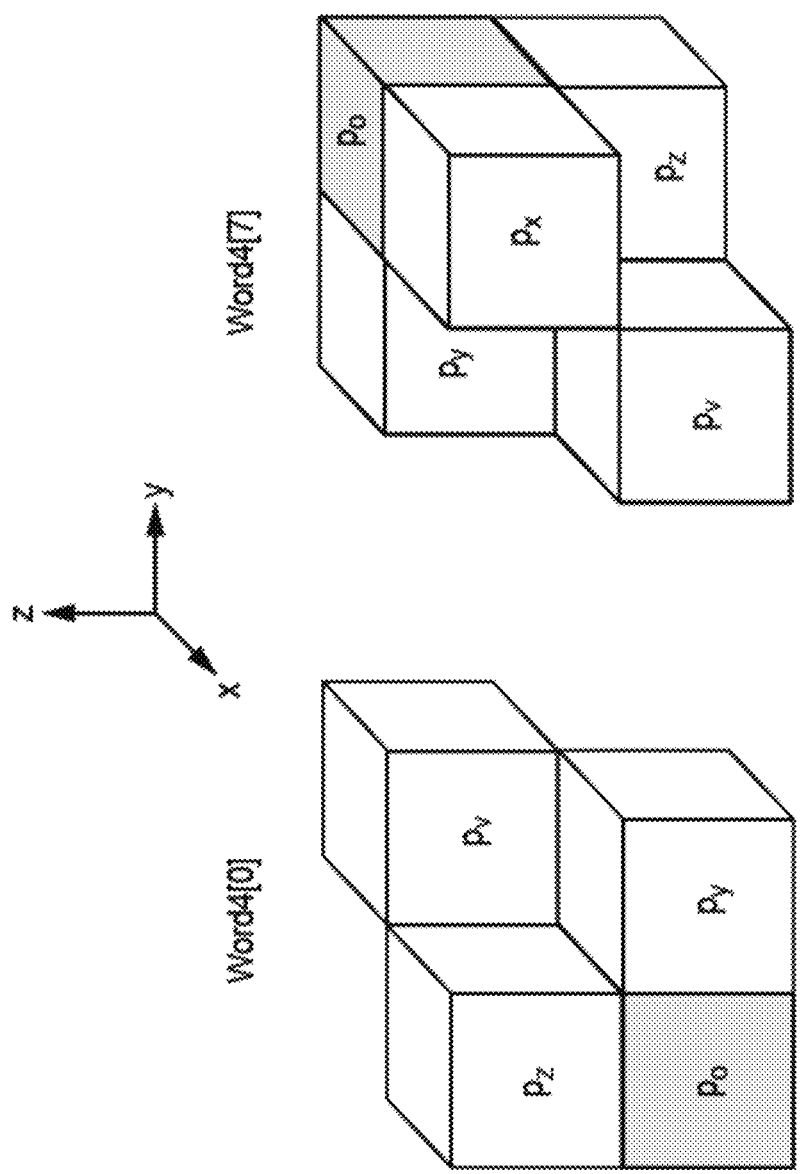
FIG. 14 is a conceptual diagram illustrating an example Word4 derivation using inter predicted occupancy for use in conjunction with the techniques of the disclosure.

Let $p_i$ be the collocated reference child node of ith child node in the current node. In one example, the occupancies of 4 neighbour nodes (set P4) of $p_i$ may be used to construct the value of Word4[i]. Also in this example, P4 may include 4 sibling nodes of $p_i$ including one child node sharing a vertex with $p_i$ and 3 child nodes which share a face with $p_i$. This example may be visualized as in FIG. 14.

The 4 bits of Word4[i] may be formatted as follows: Word4[i]=$p_x p_y p_z p_v$, where $p_x$, $p_y$, and $p_z$ is the occupancy of the child nodes which sharing the face with $p_i$ in x, y, and z direction, respectively. $p_v$ represent the occupancy of the child which sharing a vertex with $p_i$.

In another example, the Word4 value in intra coded slices may be derived using the neighbour information in the current slice, while the Word4 value is derived using the occupancy of the reference node in inter coded frames.

Combination of 8.1 and 8.2

It should be noted that, the techniques in section 8.1 and 8.2 above may be used in combination. In one example, the occupancy of the collocated child node $p_i$ is used to determine the context for occupancy coding of the ith child node while the neighbour information of the collocated child node in the reference frame may be used to derive the Word4[i] value in the inter coded frame.

In one example, the Word4 value derivation may be modified for inter coded nodes as follows. In this example, the node $N_V$ is replaced by $p_i$ (the collocated child node in the reference frame). Alternatively, Word4 value may be extended to contain 5 bits, where the first 4 bits are bits obtained from Word4 construction, and the fifth bit is obtained from $p_i$. In another example, a Word4 value may be extended to include more collocated child nodes in the reference frame; with each additional node, the number of bits used to derive Word4 may be incremented. Similar modifications may also be applied to the construction of Word7 values.

In another example, the use of collocated nodes in the reference frame may be dependent on whether the child node is a sparse region. For example, when the child node is in a sparse region, only the collocated node of the child node (p0) may be chosen to derive the occupancy. When the child node is in a non-sparse region, the collocated node of the child node and one or more of its neighbours may be used to derive the occupancy.

The sparseness of a region containing the child node may be derived by checking the occupancy of one or more neighbours of the child node, the collocated node in the reference frame and one or more neighbours of the collocated node in the reference frame.

Figure 15:
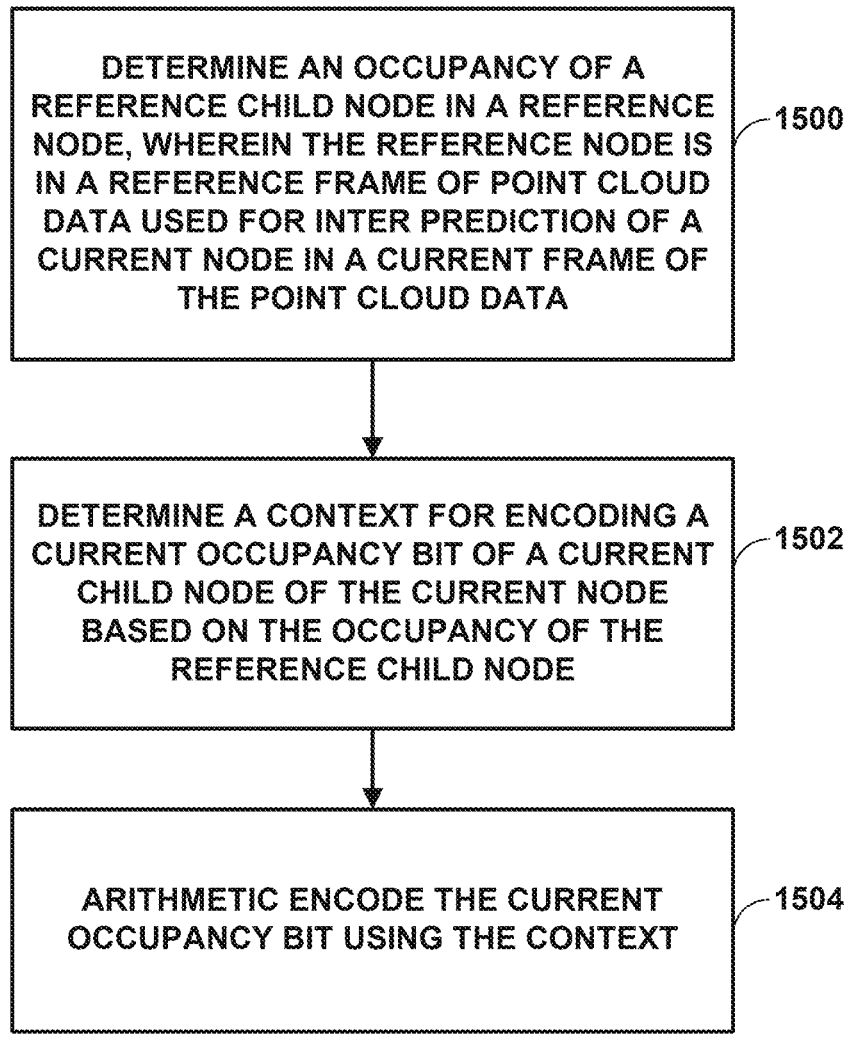
FIG. 15 is flowchart illustrating an example encoding method according to the techniques of the disclosure.

FIG. 15 is flowchart illustrating an example encoding method according to the techniques of the disclosure. The techniques of FIG. 15 may be performed by one or more structural components of G-PCC encoder 200, including arithmetic encoding unit 214.

In one example of the disclosure, G-PCC encoder 200 is configured to determine an occupancy of a reference child node in a reference node, wherein the reference node is in a reference frame of point cloud data used for inter prediction of a current node in a current frame of the point cloud data (1500). G-PCC encoder 200 may further determine a context for encoding a current occupancy bit of a current child node of the current node based on the occupancy of the reference child node (1502), and arithmetic encode the current occupancy bit using the context (1504).

In one example, the reference child node is collocated with the current child node.

In another example, the reference child node is an ith child node of the reference node, and wherein to determine the occupancy of the reference child node, G-PCC encoder 200 is configured to determine a value of an ith entry in an occupancy syntax element for the reference node.

In another example, the reference child node is an ith child node of the reference node, and wherein to determine the occupancy of the reference child node, G-PCC encoder 200 is configured to determine the occupancy of the reference child node by determining a number of points included in the reference child node.

In another example, G-PCC encoder 200 is configured to determine an occupancy of the current node using dynamic optimal binary coder with update on the fly (OBUF) and the current occupancy bit of the current child node of the current node.

In another example, G-PCC encoder 200 is configured to encode a geometry of the point cloud data using the current occupancy bit of the current child node of the current node. In one example, the geometry is an octree geometry. In another example, to encode the geometry, G-PCC encoder 200 is configured to encode the geometry using inter prediction. In another example, to encode the geometry, G-PCC encoder 200 is configured to encode the geometry using intra prediction, wherein the occupancy of the reference child node is zero. In another example, G-PCC encoder 200 is configured to encode attributes of the point cloud data, wherein the attributes and the geometry form encoded point cloud data.

In another example, to determine the context for encoding the current occupancy bit of a current child node of the current node, G-PCC encoder 200 is configured to determine the context for encoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

Figure 16:
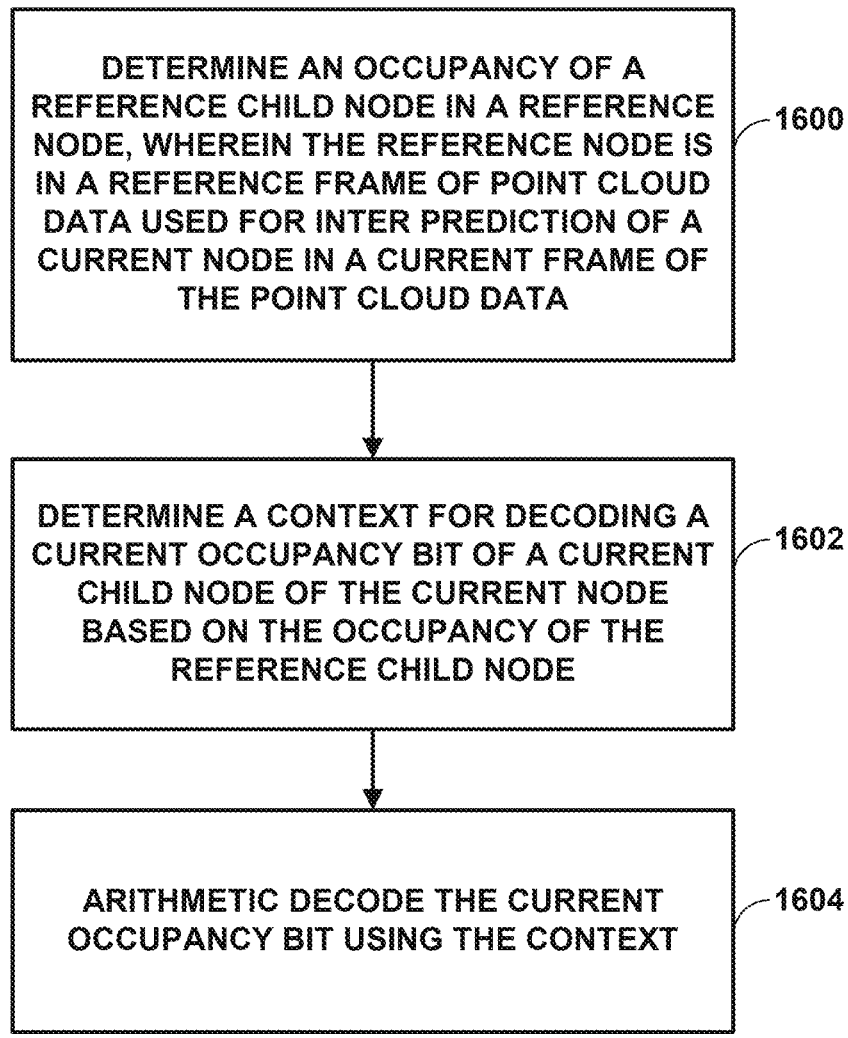
FIG. 16 is flowchart illustrating an example decoding method according to the techniques of the disclosure.

FIG. 16 is flowchart illustrating an example decoding method according to the techniques of the disclosure. The techniques of FIG. 16 may be performed by one or more structural components of G-PCC decoder 300, including geometry arithmetic decoding unit 302.

In one example of the disclosure, G-PCC decoder 300 is configured to determine an occupancy of a reference child node in a reference node, wherein the reference node is in a reference frame of point cloud data used for inter prediction of a current node in a current frame of the point cloud data (1600). G-PCC decoder 300 may further determine a context for decoding a current occupancy bit of a current child node of the current node based on the occupancy of the reference child node (1602), and arithmetic decode the current occupancy bit using the context (1604).

In one example, the reference child node is collocated with the current child node.

In another example, the reference child node is an ith child node of the reference node, and wherein to determine the occupancy of the reference child node, G-PCC decoder 300 is configured to determine a value of an ith entry in an occupancy syntax element for the reference node.

In another example, the reference child node is an ith child node of the reference node, and wherein to determine the occupancy of the reference child node, G-PCC decoder 300 is configured to determine the occupancy of the reference child node by determining a number of points included in the reference child node.

In another example, G-PCC decoder 300 is configured to determine an occupancy of the current node using dynamic optimal binary coder with update on the fly (OBUF) and the current occupancy bit of the current child node of the current node.

In another example, G-PCC decoder 300 is configured to decode a geometry of the point cloud data using the current occupancy bit of the current child node of the current node. In one example, the geometry is an octree geometry. In another example, to decode the geometry, G-PCC decoder 300 is configured to decode the geometry using inter prediction. In another example, to decode the geometry, G-PCC decoder 300 is configured to decode the geometry using intra prediction, wherein the occupancy of the reference child node is zero. In another example, G-PCC decoder 300 is configured to decode attributes of the point cloud data, wherein the attributes and the geometry form decoded point cloud data.

In another example, to determine the context for decoding the current occupancy bit of a current child node of the current node, G-PCC decoder 300 is configured to determine the context for decoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

In Version 5 InterEM (mpegx.int-evry.fr/software/MPEG/PCC/CE/mpeg-pcc-tmc13/-/tree/mpeg137/mtg/InterEM-v5.0-dev), the IDCM eligibility for inter frames may not have an optimal trade-off between coding performance and runtime complexity. For example, when the angular mode is disabled, the decoding runtime may be doubled compared to intra coding while the performance is not so high. In the current InterEM version 5, the IDCM eligibility is defined as follows:

```
inline bool
isDirectModeEligible(
    int intensity, // idcm condition which is set in configuration file
    int nodeSizeLog2, // log 2 of the size of parent node
```

```
    int nodeNeighPattern, // neighbour configuration of
       parent node (N64)
    const PCCOctree3Node& node, // parent node
    const PCCOctree3Node& child // child node (current
       node which idcm will be set)
#if INTER_EM_VERSION5
    , bool occupancyIsPredictable, // inter prediction infor-
       mation
    bool isAngularModeEnabled // angular mode ON/OFF
#endif
)
{
    if (!intensity)
       return false;
    if (occupancyIsPredictable && !isAngularModeEn-
       abled)
       return false;
    if (intensity == 1)
       return (nodeSizeLog 2>=2) && (nodeNeighPattern
          == 0)
          && (child.numSiblingsPlus1 == 1) && (node-
             .numSiblingsPlus1<=2);
    if (intensity == 2)
       return (nodeSizeLog 2>=2) && (nodeNeighPattern
          == 0);
    // This is basically unconditionally enabled.
    // If a node that is IDCM-eligible is not coded with
       IDCM and has only
    // one child, then it is likely that the child would also not
       be able to
    // be coded with IDCM (eg, it still contains>2 unique
       points).
    if (intensity == 3)
       return (nodeSizeLogZ>) && (child.numSibling-
          sPlus1>1);
    return false;
}
```

As can be seen from the above, when angular mode is disabled (i.e., when isAngularModeEnabled is false) and occupancy is predictable (i.e., occupancyIsPredictable is true), IDCM eligibility may be set to false. The above code shows this as "if (occupancyIsPredictable && !isAngular-ModeEnabled) return false." As such, in version 5, when angular mode is enabled, the IDCM eligibility does not depend on inter prediction. occupancyIsPredictable is true when mismatch between the occupancy of sibling nodes of parent node and the collocated nodes in the reference is smaller than 6 bits. If occupancyIsPredictable is true and angular mode is disabled, then octree occupancy is used. This means that possibly fewer nodes will be coded with IDCM when inter is enabled, which may not be desirable.

In accordance with one or more techniques or disclosure, a G-PCC coder (e.g., G-PCC encoder 200 or G-PCC decoder 300) may utilize alternate IDCM eligibility criterion for inter coded frames. For instance, the G-PCC coder may utilize IDCM eligibility criterion that permit IDCM eligibility to be true where angular mode is enabled or where angular mode is disabled. For example, G-PCC encoder 200 and G-PCC decoder 300 may determine, regardless of whether the angular mode is enabled for the current node, whether the current node is eligible for IDCM. As such, in one example, the inter coded frames when angular mode enabled and intra coded frames (angular enabled or angular disabled) are identical as follows (Removals relative to previous code are shown between the tags <Del>and </Del>):

```
    inline bool
    isDirectModeEligible(
       int intensity, // idcm condition which is set in configu-
          ration file
       int nodeSizeLog2, // log 2 of the size of parent node
       int nodeNeighPattern, // neighbour configuration of
          parent node (N64)
       const PCCOctree3Node& node, // parent node
       const PCCOctree3Node& child // child node (current
          node which idcm will be set)
    )
    {
       if (!intensity)
          return false;
       <Del>if (occupancyIsPredictable && !isAngular-
          ModeEnabled) return false; </Del>
       if (intensity == 1)
          return (nodeSizeLog2>=2) && (nodeNeighPat-
             tern==0)
             && (child.numSiblingsPlus1==1) && (node-
                .numSiblingsPlus1<=2);
       // child.numSiblingsPlus1==1 means child nodes has
          no sibling. node.numSiblingsPlus1<=2 means the
          parent node has at most 2 siblings.
       if (intensity==2)
          return (nodeSizeLog2>=2) && (nodeNeighPat-
             tern==0);
       // This is basically unconditionally enabled.
       // If a node is that is IDCM-eligible is not coded with
          IDCM and has only
       // one child, then it is likely that the child would also not
          be able to
       // be coded with IDCM (eg, it still contains>2 unique
          points).
       if (intensity==3)
          return (nodeSizeLog2>=2) && (child.numSibling-
             sPlus1>1);
       return false;
    }
```

As can be seen in the above example, IDCM eligibility may be determined based on intensity, with different parameters for intensity levels 0-3. IDCM may be enabled for intensity levels 1-3, regardless of whether angular mode is enabled or not. By allowing IDCM eligibility where angular mode is enabled, more nodes may be coded with IDCM. In this way, the techniques of this disclosure may desirably improve coding efficiency (e.g., as coding a node with IDCM may take fewer bits than without).

In another example, when angular is disabled, the IDCM eligibility for inter coded frames may be defined as follows:

```
    inline bool
    isDirectModeEligible_InterFrames(
       int intensity,
       int nodeSizeLog2,
       int nodeNeighPattern,
       const PCCOctree3Node& node,
       const PCCOctree3Node& child
    )
    {
       if (!intensity)
          return false;
       if (occupancyIsPredictable)
          return false;
       // child.numSiblingsPlus1 == 1 means child nodes has
          no sibling. node.numSiblingsPlus1<=2 means the
          parent node has at most 2 siblings.
       return (nodeSizeLog2>=2) && (nodeNeigh-
          Pattern == 0)
```

&& (child.numSiblingsPlus1=== 1) && (node.numSiblingsPlus1<=2);
}

As can be seen in the above example, IDCM eligibility may be determined based on intensity, occupancy predictability, and/or number of sibling, regardless of whether angular mode is enabled or not. By allowing IDCM eligibility where angular mode is enabled, more nodes may be coded with IDCM. In this way, the techniques of this disclosure may desirably improve coding efficiency (e.g., as coding a node with IDCM may take fewer bits than without).

In one example above, for inter prediction, only IDCM mode 1 is allowed under the condition that the angularMode=0 and occupancyIsPredictable=0.

In addition, the number of contexts based on inter prediction is four, which significantly increases the total number of contexts for occupancy coding. This disclosure proposes to use fewer inter prediction contexts while maintaining the coding performance. For instance, a G-PCC coder may utilize two or fewer contexts.

In InterEM version 5, four inter prediction contexts is derived in GeometryOctreeDecoder::decodeOccupancyNeighNZ((which decodes the occupancy of a node when N64 is non-zero) as follows:

```
int bitAdjGt0=(mappedOccAdjGt0>>bitIdx) & 1;
int bitAdjGt1=(mappedOccAdjGt1>>bitIdx) & 1;
int bitAdjUnocc=(mappedOccAdjUnocc>>bitIdx) & 1;
// !planar
#if INTER_EM_VERSION5
    int bitPred=(mappedPred>>bitIdx) & 1; // occupancy
        of bitIdx child node in collocated reference node
    int bitPredStrong=(mappedPredStrong>>bitIdx) & 1;
        // mappedPredStrong is derived by counting the
        number of points in each child nodes in the collocated reference node. If the number of points is
        higher than 2, the corresponding bit in mappedPredStrong is set 1, else 0.
#endif
    int numAdj=bitAdjGt0+bitAdjGt1;
    int idxAdj=bitAdjUnocc+2*numAdj;
    if (i>4) {
        static const int8_t kCtxIdxAdjReduc567[6]={0, 0, 1,
            2, 3, 3};
        idxAdj=kCtxdxAdjReduc567[idxAdj];
    }
#if INTER_EM_VERSION5
    int ctxIdxMapIdx=4*idxAdj;
#else
    int ctxIdxMapIdx=3*idxAdj;
    if (!maskedOccupancy) {// !planar
#endif
    int bitIsPredicted=(mappedOccIsPredicted>>bitIdx) &
        1;
    int bitPrediction=(mappedOccPrediction>>bitIdx) &
        1;
#if INTER_EM_VERSION5
    ctxIdxMapIdx=4*idxAdj+bitIsPredicted+bitPrediction
        //    intra+!!mappedPred+bitPred+bitPredStrong;
        // inter
#else
    ctxIdxMapIdx=3*idxAdj+bitIsPredicted+bitPrediction; // this code is deactivated in InterEM
    }
#endif
```

In accordance with one or more techniques of this disclosure, a G-PCC coder may utilize the occupancy bit of the collocated child node may be used as the context for occupancy coding of the current child node. For instance, the G-PCC coder may operate in accordance with the following (Removals relative to previous code are shown between the tags <Del>and </Del>):

```
int bitAdjGt0=(mappedOccAdjGt0>>bitIdx) & 1;
int bitAdjGt1=(mappedOccAdjGt1>>bitIdx) & 1;
int bitAdjUnocc=(mappedOccAdjUnocc>>bitIdx) &
    1;
// !planar
#if INTER_EM_VERSION5
    int bitPred=(mappedPred>>bitIdx) & 1; // occupancy
        of bitIdx child node in collocated reference node
    <Del> int bitPredStrong=(mappedPredStrong>>bitIdx)
        & 1; // mappedPredStrong is derivate by counting the
        number of points in each child nodes in the collocated reference node. If the number of points is
        higher than 2, the corresponding bit in mappedPredStrong is set 1, else 0. </Del>
#endif
    int numAdj=bitAdjGt0+bitAdjGt1;
    int idxAdj=bitAdjUnocc+2*numAdj;
    if (i>4) {
        static const int8_t kCtxIdxAdjReduc567[6]={0, 0, 1,
            2, 3, 3};
        idxAdj=kCtxIdxAdjReduc567[idxAdj];
    }
#if INTER_EM_VERSION5
    int ctxIdxMapIdx=4*idxAdj;
#else
    int ctxIdxMapIdx=3*idxAdj;
    if (!maskedOccupancy) {// !planar
#endif
    int bitIsPredicted=(mappedOccIsPredicted>>bitIdx) &
        1;
    int bitPrediction=(mappedOccPrediction>>bitIdx) &
        1;
#if INTER_EM_VERSION5
    ctxIdxMapIdx=4*idxAdj+bitIsPredicted+bitPrediction
        // intra
        <Del></Del>+bitPred <Del></Del>; // inter
#else
    ctxIdxMapIdx=3*idxAdj+bitIsPredicted+bitPrediction;
    }
#endif
```

And the code in function GeometryOctreeDecoder::decodeOccupancyNeighZ( ) (which decodes the occupancy of a node when N64 is zero) may be modified accordingly as follows:

```
int bitAdjGt0=(mappedOccAdjGt0>>bitIdx) & 1;
int bitAdjGt1=(mappedOccAdjGt1>>bitIdx) & 1;
int bitAdjUnocc=(mappedOccAdjUnocc>>bitIdx) & 1;
#if INTER_EM_VERSION5
    int bitPred=(mappedPred>>bitIdx) & 1;
    <Del>int bitPredStrong=(mappedPredStrong>>bitIdx)
        & 1; </Del>
#endif
    int numAdj=bitAdjGt0+bitAdjGt1;
    int idxAdj=bitAdjUnocc+2*numAdj;
    if (i>4) {
        static const int8_t kCtxIdxAdjReduc567[6]={0, 0, 1,
            2, 3, 3};
        idxAdj=kCtxIdxAdjReduc567[idxAdj];
    }
```

```
#if INTER_EM_VERSION5
    int ctxIdxMapIdx=4*idxAdj;
#else
    int ctxIdxMapIdx=3*idxAdj;
    if (!maskedOccupancy) {
#endif
    int bitIsPredicted=(mappedOccIsPredicted>>bitIdx) &
        1;
    int bitPrediction=(mappedOccPrediction>>bitIdx) &
        1;
#if INTER_EM_VERSION5
    ctxIdxMapIdx=4*idxAdj+bitIsPredicted+bitPrediction
        // intra
    <Del>!!mappedPred+</Del>bitPred       <Del>+bitPred-
        Strong</Del>; // inter
#else
    ctxIdxMapIdx=3*idxAdj+bitIsPredicted+bitPredic-
        tion;
    }
#endif
```

Figure 17:
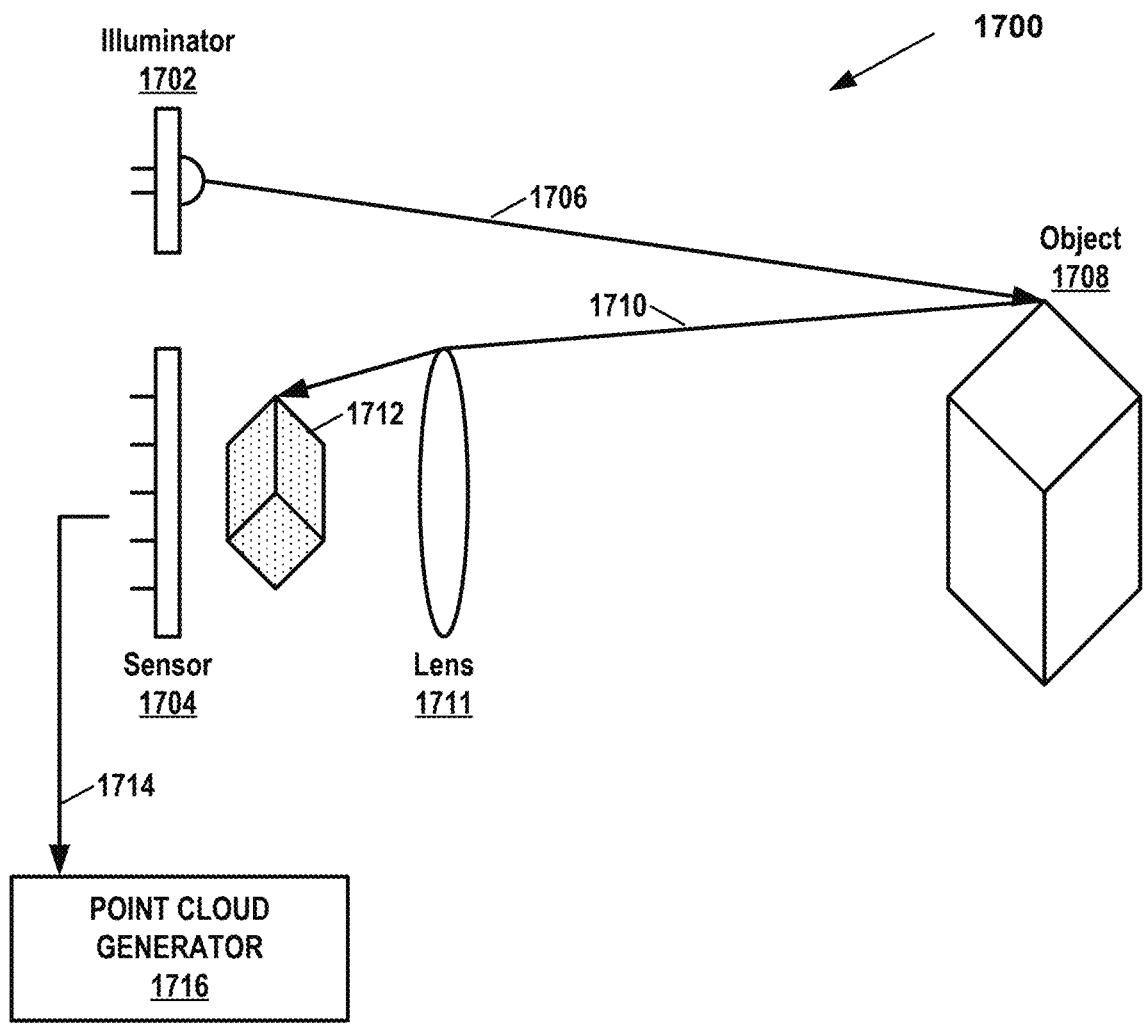
FIG. 17 is a conceptual diagram illustrating an example range-finding system that may be used with one or more techniques of this disclosure.

FIG. 17 is a conceptual diagram illustrating an example range-finding system 1700 that may be used with one or more techniques of this disclosure. In the example of FIG. 17, range-finding system 1700 includes an illuminator 1702 and a sensor 1704.

Illuminator 1702 may emit light 1706. In some examples, illuminator 1702 may emit light 1706 as one or more laser beams. Light 1706 may be in one or more wavelengths, such as an infrared wavelength or a visible light wavelength. In other examples, light 1706 is not coherent, laser light. When light 1706 encounters an object, such as object 1708, light 1706 creates returning light 1710. Returning light 1710 may include backscattered and/or reflected light. Returning light 1710 may pass through a lens 1711 that directs returning light 1710 to create an image 1712 of object 1708 on sensor 1704. Sensor 1704 generates signals 1714 based on image 1712. Image 1712 may comprise a set of points (e.g., as represented by dots in image 1712 of FIG. 17).

In some examples, illuminator 1702 and sensor 1704 may be mounted on a spinning structure so that illuminator 1702 and sensor 1704 capture a 360-degree view of an environment (e.g., a spinning LIDAR sensor). In other examples, range-finding system 1700 may include one or more optical components (e.g., mirrors, collimators, diffraction gratings, etc.) that enable illuminator 1702 and sensor 1704 to detect ranges of objects within a specific range (e.g., up to 360-degrees). Although the example of FIG. 17 only shows a single illuminator 1702 and sensor 1704, range-finding system 1700 may include multiple sets of illuminators and sensors.

In some examples, illuminator 1702 generates a structured light pattern. In such examples, range-finding system 1700 may include multiple sensors 1704 upon which respective images of the structured light pattern are formed. Range-finding system 1700 may use disparities between the images of the structured light pattern to determine a distance to an object 1708 from which the structured light pattern backscatters. Structured light-based range-finding systems may have a high level of accuracy (e.g., accuracy in the sub-millimeter range), when object 1708 is relatively close to sensor 1704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1700 is a time of flight (ToF)-based system. In some examples where range-finding system 1700 is a ToF-based system, illuminator 1702 generates pulses of light. In other words, illuminator 1702 may modulate the amplitude of emitted light 1706. In such examples, sensor 1704 detects returning light 1710 from the pulses of light 1706 generated by illuminator 1702. Range-finding system 1700 may then determine a distance to object 1708 from which light 1706 backscatters based on a delay between when light 1706 was emitted and detected and the known speed of light in air). In some examples, rather than (or in addition to) modulating the amplitude of the emitted light 1706, illuminator 1702 may modulate the phase of the emitted light 1706. In such examples, sensor 1704 may detect the phase of returning light 1710 from object 1708 and determine distances to points on object 1708 using the speed of light and based on time differences between when illuminator 1702 generated light 1706 at a specific phase and when sensor 1704 detected returning light 1710 at the specific phase.

In other examples, a point cloud may be generated without using illuminator 1702. For instance, in some examples, sensors 1704 of range-finding system 1700 may include two or more optical cameras. In such examples, range-finding system 1700 may use the optical cameras to capture stereo images of the environment, including object 1708. Range-finding system 1700 may include a point cloud generator 1716 that may calculate the disparities between locations in the stereo images. Range-finding system 1700 may then use the disparities to determine distances to the locations shown in the stereo images. From these distances, point cloud generator 1716 may generate a point cloud.

Sensors 1704 may also detect other attributes of object 1708, such as color and reflectance information. In the example of FIG. 17, a point cloud generator 1716 may generate a point cloud based on signals 1714 generated by sensor 1704. Range-finding system 1700 and/or point cloud generator 1716 may form part of data source 104 (FIG. 1). Hence, a point cloud generated by range-finding system 1700 may be encoded and/or decoded according to any of the techniques of this disclosure. Inter prediction and residual prediction, as described in this disclosure may reduce the size of the encoded data.

Figure 18:
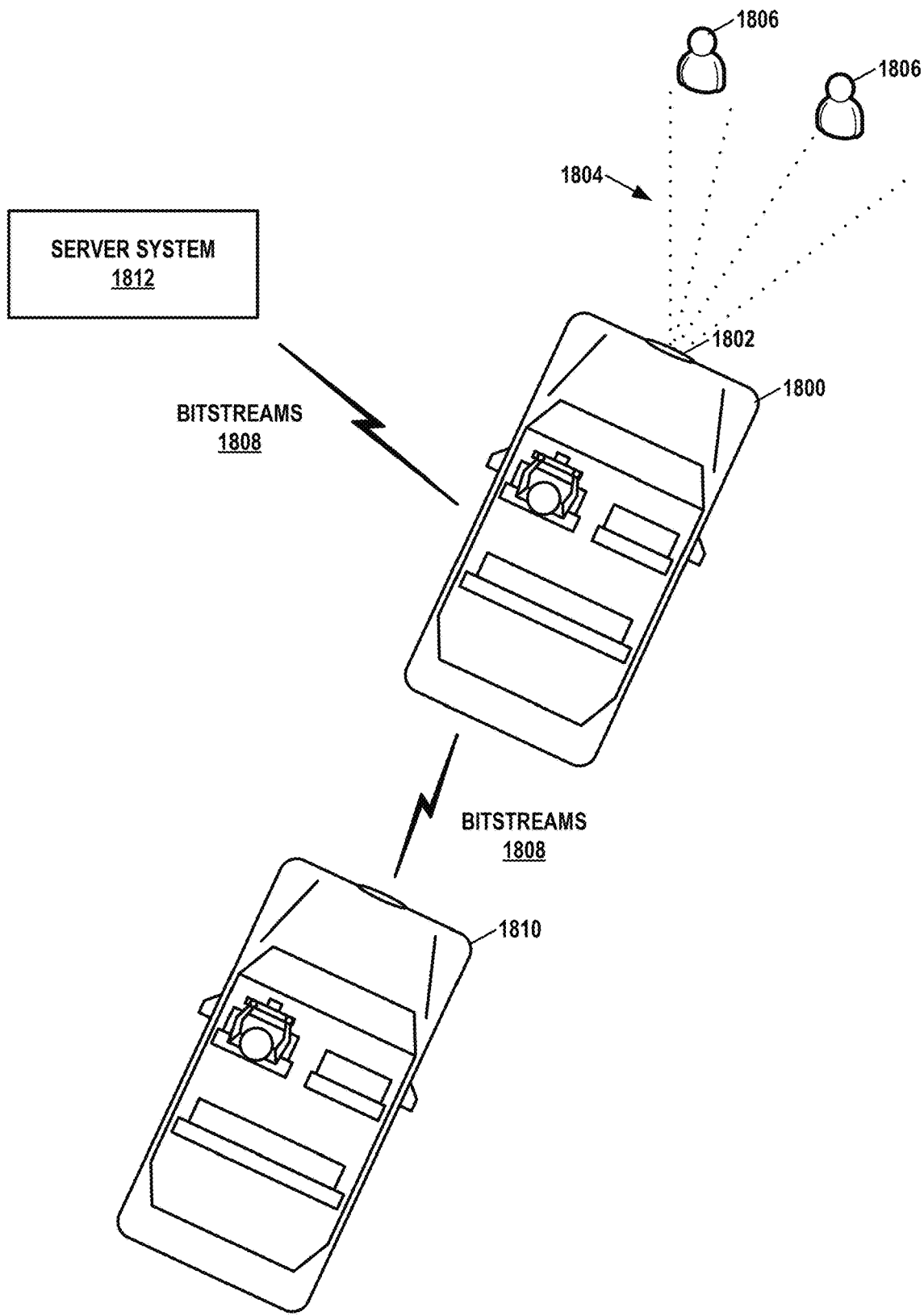
FIG. 18 is a conceptual diagram illustrating an example vehicle-based scenario in which one or more techniques of this disclosure may be used.

FIG. 18 is a conceptual diagram illustrating an example vehicle-based scenario in which one or more techniques of this disclosure may be used. In the example of FIG. 18, a vehicle 1800 includes a range-finding system 1802. Range-finding system 1802 may be implemented in the manner discussed with respect to FIG. 17. Although not shown in the example of FIG. 18, vehicle 1800 may also include a data source, such as data source 104 (FIG. 1), and a G-PCC encoder, such as G-PCC encoder 200 (FIG. 1). In the example of FIG. 18, range-finding system 1802 emits laser beams 1804 that reflect off pedestrians 1806 or other objects in a roadway. The data source of vehicle 1800 may generate a point cloud based on signals generated by range-finding system 1802. The G-PCC encoder of vehicle 1800 may encode the point cloud to generate bitstreams 1808, such as geometry bitstream (FIG. 2) and attribute bitstream (FIG. 2). Inter prediction and residual prediction, as described in this disclosure may reduce the size of the geometry bitstream. Bitstreams 1808 may include many fewer bits than the unencoded point cloud obtained by the G-PCC encoder.

An output interface of vehicle 1800 (e.g., output interface 108 (FIG. 1) may transmit bitstreams 1808 to one or more other devices. Bitstreams 1808 may include many fewer bits than the unencoded point cloud obtained by the G-PCC encoder. Thus, vehicle 1800 may be able to transmit bitstreams 1808 to other devices more quickly than the unencoded point cloud data. Additionally, bitstreams 1808 may require less data storage capacity on a device.

In the example of FIG. 18, vehicle 1800 may transmit bitstreams 1808 to another vehicle 1810. Vehicle 1810 may include a G-PCC decoder, such as G-PCC decoder 300 (FIG. 1). The G-PCC decoder of vehicle 1810 may decode bitstreams 1808 to reconstruct the point cloud. Vehicle 1810 may use the reconstructed point cloud for various purposes. For instance, vehicle 1810 may determine based on the reconstructed point cloud that pedestrians 1806 are in the roadway ahead of vehicle 1800 and therefore start slowing down, e.g., even before a driver of vehicle 1810 realizes that pedestrians 1806 are in the roadway. Thus, in some examples, vehicle 1810 may perform an autonomous navigation operation based on the reconstructed point cloud.

Additionally or alternatively, vehicle 1800 may transmit bitstreams 1808 to a server system 1812. Server system 1812 may use bitstreams 1808 for various purposes. For example, server system 1812 may store bitstreams 1808 for subsequent reconstruction of the point clouds. In this example, server system 1812 may use the point clouds along with other data (e.g., vehicle telemetry data generated by vehicle 1800) to train an autonomous driving system. In other example, server system 1812 may store bitstreams 1808 for subsequent reconstruction for forensic crash investigations.

Figure 19:
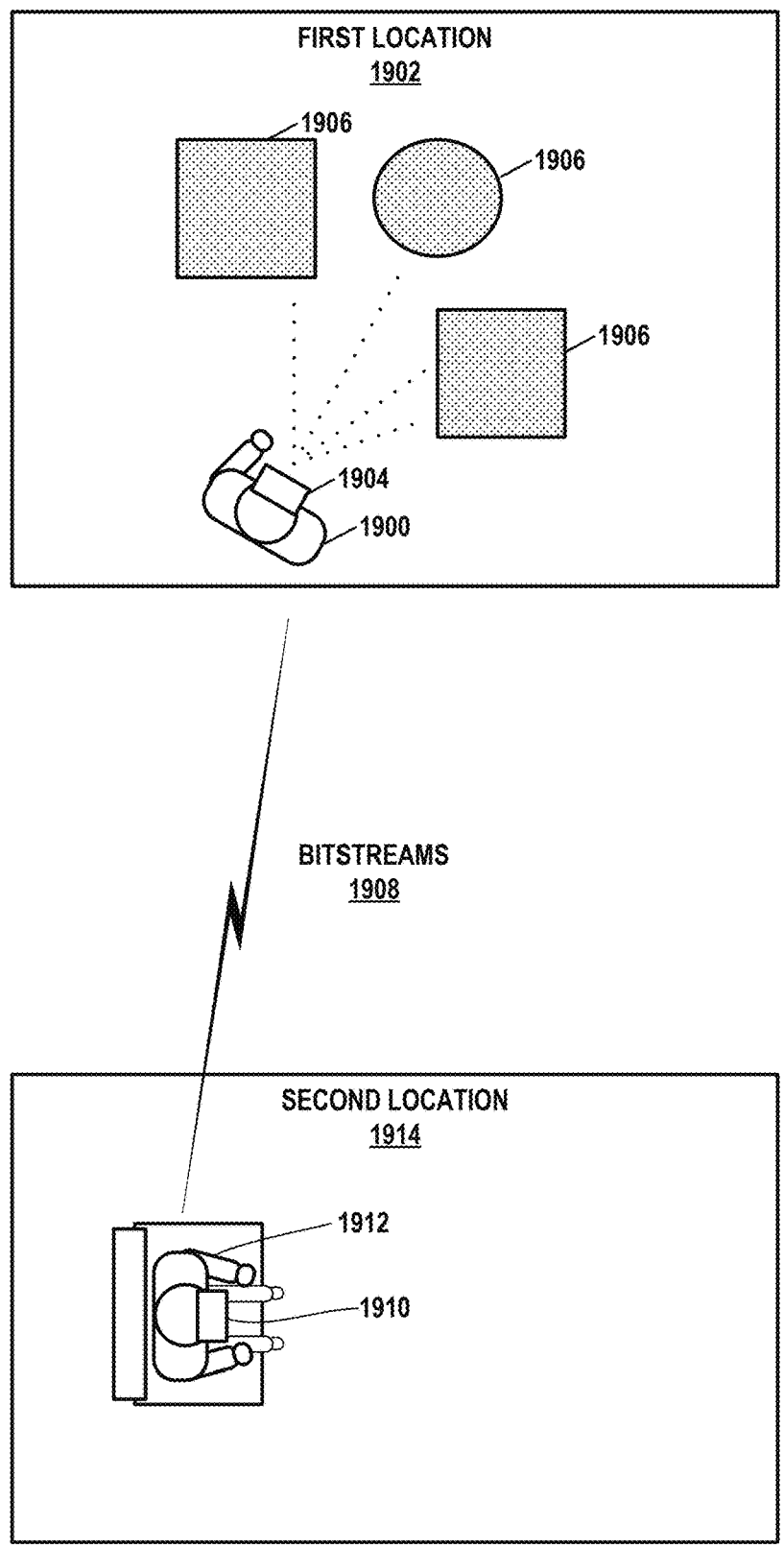
FIG. 19 is a conceptual diagram illustrating an example extended reality system in which one or more techniques of this disclosure may be used.

FIG. 19 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 19, a user 1900 is located in a first location 1902. User 1900 wears an XR headset 1904. As an alternative to XR headset 1904, user 1900 may use a mobile device (e.g., mobile phone, tablet computer, etc.). XR headset 1904 includes a depth detection sensor, such as a range-finding system, that detects positions of points on objects 1906 at location 1902. A data source of XR headset 1904 may use the signals generated by the depth detection sensor to generate a point cloud representation of objects 1906 at location 1902. XR headset 1904 may include a G-PCC encoder (e.g., G-PCC encoder 200 of FIG. 1) that is configured to encode the point cloud to generate bitstreams 1908. Inter prediction and residual prediction, as described in this disclosure may reduce the size of bitstream 1908.

XR headset 1904 may transmit bitstreams 1908 (e.g., via a network such as the Internet) to an XR headset 1910 worn by a user 1912 at a second location 1914. XR headset 1910 may decode bitstreams 1908 to reconstruct the point cloud. XR headset 1910 may use the point cloud to generate an XR visualization (e.g., an AR, MR, VR visualization) representing objects 1906 at location 1902. Thus, in some examples, such as when XR headset 1910 generates an VR visualization, user 1912 may have a 3D immersive experience of location 1902. In some examples, XR headset 1910 may determine a position of a virtual object based on the reconstructed point cloud. For instance, XR headset 1910 may determine, based on the reconstructed point cloud, that an environment (e.g., location 1902) includes a flat surface and then determine that a virtual object (e.g., a cartoon character) is to be positioned on the flat surface. XR headset 1910 may generate an XR visualization in which the virtual object is at the determined position. For instance, XR headset 1910 may show the cartoon character sitting on the flat surface.

Figure 20:
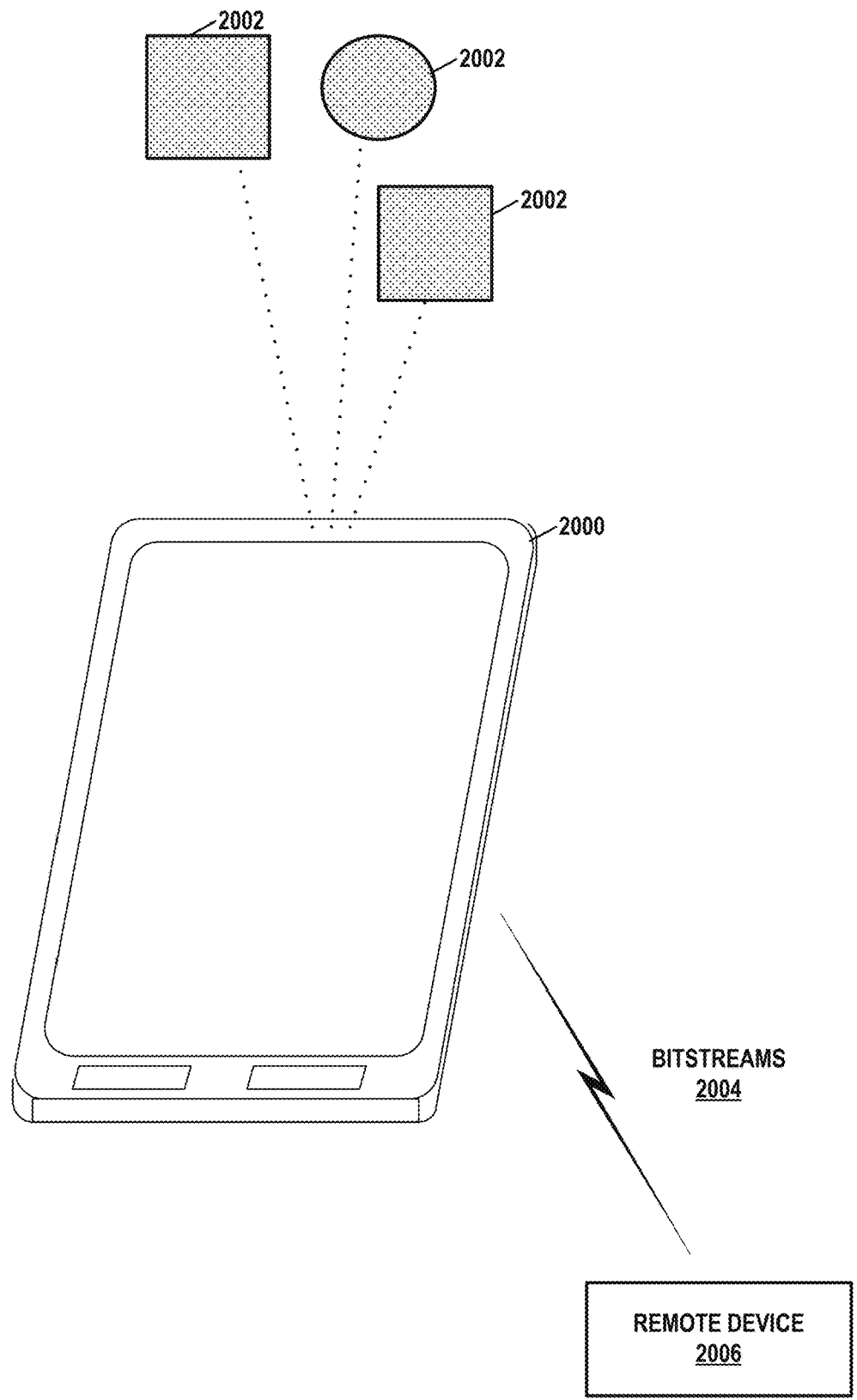
FIG. 20 is a conceptual diagram illustrating an example mobile device system in which one or more techniques of this disclosure may be used.

FIG. 20 is a conceptual diagram illustrating an example mobile device system in which one or more techniques of this disclosure may be used. In the example of FIG. 20, a mobile device 2000 (e.g., a wireless communication device), such as a mobile phone or tablet computer, includes a range-finding system, such as a LIDAR system, that detects positions of points on objects 2002 in an environment of mobile device 2000. A data source of mobile device 2000 may use the signals generated by the depth detection sensor to generate a point cloud representation of objects 2002. Mobile device 2000 may include a G-PCC encoder (e.g., G-PCC encoder 200 of FIG. 1) that is configured to encode the point cloud to generate bitstreams 2004. In the example of FIG. 20, mobile device 2000 may transmit bitstreams to a remote device 2006, such as a server system or other mobile device. Inter prediction and residual prediction, as described in this disclosure may reduce the size of bitstreams 2004. Remote device 2006 may decode bitstreams 2004 to reconstruct the point cloud. Remote device 2006 may use the point cloud for various purposes. For example, remote device 2006 may use the point cloud to generate a map of environment of mobile device 2000. For instance, remote device 2006 may generate a map of an interior of a building based on the reconstructed point cloud. In another example, remote device 2006 may generate imagery (e.g., computer graphics) based on the point cloud. For instance, remote device 2006 may use points of the point cloud as vertices of polygons and use color attributes of the points as the basis for shading the polygons. In some examples, remote device 2006 may use the reconstructed point cloud for facial recognition or other security applications.

Examples in the various aspects of this disclosure may be used individually or in any combination. Additional aspects are described below:

Aspect 1A—A method of coding a point cloud, the method comprising: determining an occupancy bit of an ith child node in a reference node; determining a context for coding a current occupancy bit of an ith node of a current node based on the occupancy bit of the ith child node in the reference mode; and arithmetic coding the current occupancy bit using the context.

Aspect 2A—A method of coding a point cloud, the method comprising: determining an occupancy bit a sibling node of a collocated node in a reference frame; determining a context for coding a current occupancy bit a current node based on the occupancy bit of the sibling node of the collocated node in the reference frame; and arithmetic coding the current occupancy bit using the context.

Aspect 3A—The method of any of Aspects 1A-2A, further comprising generating the point cloud.

Aspect 4A—A device for processing a point cloud, the device comprising one or more means for performing the method of any of Aspects 1A-3A.

Aspect 5A—The device of Aspect 4A, wherein the one or more means comprise one or more processors implemented in circuitry.

Aspect 6A—The device of any of Aspects 4A or 5A, further comprising a memory to store the data representing the point cloud.

Aspect 7A—The device of any of Aspects 4A-6A, wherein the device comprises a decoder.

Aspect 8A—The device of any of Aspects 4A-7A, wherein the device comprises an encoder.

Aspect 9A—The device of any of Aspects 4A-8A, further comprising a device to generate the point cloud.

Aspect 10A—The device of any of Aspects 4A-9A, further comprising a display to present imagery based on the point cloud.

Aspect 11A—A computer-readable storage medium having stored thereon instructions that, when executed, cause one or more processors to perform the method of any of Aspects 1A-3A.

Aspect 1B—An apparatus configured to decode point cloud data, the apparatus comprising: a memory configured to store the point cloud data; and one or more processors in communication with the memory, the one or more processors configured to: determine an occupancy of a reference child node in a reference node, wherein the reference node is in a reference frame of point cloud data used for inter prediction of a current node in a current frame of the point cloud data; determine a context for decoding a current occupancy bit of a current child node of the current node based on the occupancy of the reference child node; and arithmetic decode the current occupancy bit using the context.

Aspect 2B—The apparatus of Aspect 1B, wherein the reference child node is collocated with the current child node.

Aspect 3B—The apparatus of Aspect 1B, wherein the reference child node is an ith child node of the reference node, and wherein to determine the occupancy of the reference child node, the one or more processors are configured to: determine a value of an ith entry in an occupancy syntax element for the reference node.

Aspect 4B— the apparatus of Aspect 1B, wherein the reference child node is an ith child node of the reference node, and wherein to determine the occupancy of the reference child node, the one or more processors are configured to: determine the occupancy of the reference child node by determining a number of points included in the reference child node.

Aspect 5B—The apparatus of any of Aspects 1B-4B, wherein the one or more processors are further configured to: determine an occupancy of the current node using dynamic optimal binary coder with update on the fly (OBUF) and the current occupancy bit of the current child node of the current node.

Aspect 6B—The apparatus of any of Aspects 1B-5B, wherein the one or more processors are further configured to: decode a geometry of the point cloud data using the current occupancy bit of the current child node of the current node.

Aspect 7B—The apparatus of Aspect 6B, wherein the geometry is an octree geometry.

Aspect 8B—The apparatus of Aspect 6B, wherein to decode the geometry, the one or more processors are configured to: decode the geometry using inter prediction.

Aspect 9B—The apparatus of Aspect 6B, wherein to decode the geometry, the one or more processors are configured to: decode the geometry using intra prediction, wherein the occupancy of the reference child node is zero.

Aspect 10B—The apparatus of Aspect 6B, wherein the one or more processors are further configured to decode attributes of the point cloud data, wherein the attributes and the geometry form decoded point cloud data, the apparatus further comprising: a display configured to display the decoded point cloud data.

Aspect 11B—The apparatus of any of Aspects 1B-10B, wherein to determine the context for decoding the current occupancy bit of a current child node of the current node, the one or more processors are further configured to: determine the context for decoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

Aspect 12B—A method for decoding point cloud data, the method comprising: determining an occupancy of a reference child node in a reference node, wherein the reference node is in a reference frame of point cloud data used for inter prediction of a current node in a current frame of the point cloud data; determining a context for decoding a current occupancy bit of a current child node of the current node based on the occupancy of the reference child node; and arithmetic decoding the current occupancy bit using the context.

Aspect 13B—The method of Aspect 12B, wherein the reference child node is collocated with the current child node.

Aspect 14B—The method of Aspect 12B, wherein the reference child node is an ith child node of the reference node, and wherein determining the occupancy of the reference child node comprises: determining a value of an ith entry in an occupancy syntax element for the reference node.

Aspect 15B—The method of Aspect 12B, wherein the reference child node is an ith child node of the reference node, and wherein determining the occupancy of the reference child node comprises: determining the occupancy of the reference child node by determining a number of points included in the reference child node.

Aspect 16B—The method of any of Aspects 12B-15B, further comprising: determining an occupancy of the current node using dynamic optimal binary coder with update on the fly (OBUF) and the current occupancy bit of the current child node of the current node.

Aspect 17B—The method of any of Aspects 12B-16B, further comprising: decode a geometry of the point cloud data using the current occupancy bit of the current child node of the current node.

Aspect 18B—The method of Aspect 17B, wherein the geometry is an octree geometry.

Aspect 19B—The method of Aspect 17B, wherein decoding the geometry comprises: decoding the geometry using inter prediction.

Aspect 20B—The method of Aspect 17B, wherein decoding the geometry comprises: decoding the geometry using intra prediction, wherein the occupancy of the reference child node is zero.

Aspect 21B—The method of Aspect 17B, further comprising decoding attributes of the point cloud data, wherein the attributes and the geometry form decoded point cloud data, the method further comprising: displaying the decoded point cloud data.

Aspect 22B—The method of any of Aspects 12B-21B, wherein determining the context for decoding the current occupancy bit of a current child node of the current node comprises: determining the context for decoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

Aspect 23B—A non-transitory computer-readable storage medium storing instructions that, when executed, cause one or more processors of a device configured to decode point cloud data to: determine an occupancy of a reference child node in a reference node, wherein the reference node is in a reference frame of point cloud data used for inter prediction of a current node in a current frame of the point cloud data; determine a context for decoding a current occupancy bit of a current child node of the current node based on the occupancy of the reference child node; and arithmetic decode the current occupancy bit using the context.

Aspect 24B—An apparatus configured to decode point cloud data, the apparatus comprising: means for determining an occupancy of a reference child node in a reference node, wherein the reference node is in a reference frame of point cloud data used for inter prediction of a current node in a current frame of the point cloud data; means for determining a context for decoding a current occupancy bit of a current child node of the current node based on the occupancy of the reference child node; and means for arithmetic decoding the current occupancy bit using the context.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode point cloud data, the apparatus comprising:
   a memory configured to store the point cloud data; and
   one or more processors in communication with the memory, the one or more processors configured to:
      determine an occupancy of a reference child node in a reference node, wherein the reference node is in a reference frame of point cloud data used for inter prediction of a current node in a current frame of the point cloud data;
      determine a context for decoding a current occupancy bit of a current child node of the current node based on the occupancy of the reference child node; and
      arithmetic decode the current occupancy bit using the context.

2. The apparatus of claim 1, wherein the reference child node is collocated with the current child node.

3. The apparatus of claim 1, wherein the reference child node is an ith child node of the reference node, and wherein to determine the occupancy of the reference child node, the one or more processors are configured to:
   determine a value of an ith entry in an occupancy syntax element for the reference node.

4. The apparatus of claim 1, wherein the reference child node is an ith child node of the reference node, and wherein to determine the occupancy of the reference child node, the one or more processors are configured to:
   determine the occupancy of the reference child node by determining a number of points included in the reference child node.

5. The apparatus of claim 1, wherein the one or more processors are further configured to:
   determine an occupancy of the current node using dynamic optimal binary coder with update on a fly (OBUF) and the current occupancy bit of the current child node of the current node.

6. The apparatus of claim 1, wherein the one or more processors are further configured to:
 decode a geometry of the point cloud data using the current occupancy bit of the current child node of the current node.

7. The apparatus of claim 6, wherein the geometry is an octree geometry.

8. The apparatus of claim 6, wherein to decode the geometry, the one or more processors are configured to:
 decode the geometry using inter prediction.

9. The apparatus of claim 6, wherein to decode the geometry, the one or more processors are configured to:
 decode the geometry using intra prediction, wherein the occupancy of the reference child node is zero.

10. The apparatus of claim 6, wherein the one or more processors are further configured to decode attributes of the point cloud data, wherein the attributes and the geometry form decoded point cloud data, the apparatus further comprising:
 a display configured to display the decoded point cloud data.

11. The apparatus of claim 1, wherein to determine the context for decoding the current occupancy bit of the current child node of the current node, the one or more processors are further configured to:
 determine the context for decoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

12. A method for decoding point cloud data, the method comprising:
 determining an occupancy of a reference child node in a reference node, wherein the reference node is in a reference frame of point cloud data used for inter prediction of a current node in a current frame of the point cloud data;
 determining a context for decoding a current occupancy bit of a current child node of the current node based on the occupancy of the reference child node; and
 arithmetic decoding the current occupancy bit using the context.

13. The method of claim 12, wherein the reference child node is collocated with the current child node.

14. The method of claim 12, wherein the reference child node is an ith child node of the reference node, and wherein determining the occupancy of the reference child node comprises:
 determining a value of an ith entry in an occupancy syntax element for the reference node.

15. The method of claim 12, wherein the reference child node is an ith child node of the reference node, and wherein determining the occupancy of the reference child node comprises:
 determining the occupancy of the reference child node by determining a number of points included in the reference child node.

16. The method of claim 12, further comprising:
 determining an occupancy of the current node using dynamic optimal binary coder with update on a fly (OBUF) and the current occupancy bit of the current child node of the current node.

17. The method of claim 12, further comprising:
 decode a geometry of the point cloud data using the current occupancy bit of the current child node of the current node.

18. The method of claim 17, wherein the geometry is an octree geometry.

19. The method of claim 17, wherein decoding the geometry comprises:
 decoding the geometry using inter prediction.

20. The method of claim 17, wherein decoding the geometry comprises:
 decoding the geometry using intra prediction, wherein the occupancy of the reference child node is zero.

21. The method of claim 17, further comprising decoding attributes of the point cloud data, wherein the attributes and the geometry form decoded point cloud data, the method further comprising:
 displaying the decoded point cloud data.

22. The method of claim 12, wherein determining the context for decoding the current occupancy bit of the current child node of the current node comprises:
 determining the context for decoding the current occupancy bit of a current child node of the current node based on the occupancy of the reference child node, and one or more sibling occupancies of one or more reference sibling nodes, wherein the reference sibling nodes are located in a spatial neighbourhood of the reference child node.

23. A non-transitory computer-readable storage medium storing instructions that, when executed, cause one or more processors of a device configured to decode point cloud data to:
 determine an occupancy of a reference child node in a reference node, wherein the reference node is in a reference frame of point cloud data used for inter prediction of a current node in a current frame of the point cloud data;
 determine a context for decoding a current occupancy bit of a current child node of the current node based on the occupancy of the reference child node; and
 arithmetic decode the current occupancy bit using the context.

24. An apparatus configured to decode point cloud data, the apparatus comprising:
 means for determining an occupancy of a reference child node in a reference node, wherein the reference node is in a reference frame of point cloud data used for inter prediction of a current node in a current frame of the point cloud data;
 means for determining a context for decoding a current occupancy bit of a current child node of the current node based on the occupancy of the reference child node; and
 means for arithmetic decoding the current occupancy bit using the context.

* * * * *